(12) United States Patent
Tsuruta

(10) Patent No.: US 11,982,311 B2
(45) Date of Patent: May 14, 2024

(54) ROLLING BEARING

(71) Applicant: NIPPON THOMPSON CO., LTD., Tokyo (JP)

(72) Inventor: Kenichiro Tsuruta, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 170 days.

(21) Appl. No.: 17/764,244

(22) PCT Filed: Sep. 8, 2020

(86) PCT No.: PCT/JP2020/033916
§ 371 (c)(1),
(2) Date: Mar. 28, 2022

(87) PCT Pub. No.: WO2021/059962
PCT Pub. Date: Apr. 1, 2021

(65) Prior Publication Data
US 2022/0333639 A1    Oct. 20, 2022

(30) Foreign Application Priority Data
Sep. 27, 2019   (JP) .................................. 2019-177932

(51) Int. Cl.
*F16C 19/36* (2006.01)
*F16C 33/58* (2006.01)
(Continued)

(52) U.S. Cl.
CPC ............ *F16C 19/36* (2013.01); *F16C 19/362* (2013.01); *F16C 33/58* (2013.01); *F16C 33/588* (2013.01);
(Continued)

(58) Field of Classification Search
CPC ........ F16C 19/36; F16C 19/362; F16C 33/58; F16C 33/588; F16C 33/60; F16C 33/782; F16C 33/7886; F16C 33/80
See application file for complete search history.

(56) References Cited

U.S. PATENT DOCUMENTS 4,362,344 A   12/1982   Lederman
4,368,932 A    1/1983   Wolzenburg
(Continued)

FOREIGN PATENT DOCUMENTS

DE   102017106195 B3   6/2018
JP        5395043 U1   8/1978
(Continued)

OTHER PUBLICATIONS

Chinese office action dated Sep. 1, 2023, from corresponding Chinese office action 202080069379.5.

*Primary Examiner* — Phillip A Johnson
(74) *Attorney, Agent, or Firm* — Browdy and Neimark, PLLC

(57) ABSTRACT

A rolling bearing 1 includes an outer ring 1A, an inner ring 1B, a plurality of rolling elements 1C, and a seal member 1D. The outer ring 1A includes a first outer ring 10 and a second outer ring 20. The inner ring 1B includes a first inner ring 30 and a second inner ring 40. The seal member 1D includes an annular base portion 61, 71 fixed to one bearing ring which is one of the outer ring 1A and the inner ring 1B, and an annular protruding portion 62, 72 protruding from the base portion 61, 71 and extending toward a first region which is a region opposing the one hearing ring in another bearing ring which is the other of the outer ring 1A and the inner ring 1B.

8 Claims, 15 Drawing Sheets

(51) Int. Cl.
*F16C 33/60* (2006.01)
*F16C 33/78* (2006.01)
*F16C 33/80* (2006.01)

(52) U.S. Cl.
CPC ............ *F16C 33/60* (2013.01); *F16C 33/782* (2013.01); *F16C 33/7886* (2013.01); *F16C 33/80* (2013.01)

(56) References Cited

U.S. PATENT DOCUMENTS

| | | | | |
|---|---|---|---|---|
| 4,458,959 | A | * | 7/1984 | Roling ................... F16C 33/60 384/621 |
| 2018/0266484 | A1 | | 9/2018 | Sakai et al. |

FOREIGN PATENT DOCUMENTS

| | | |
|---|---|---|
| JP | 62119525 U1 | 7/1987 |
| JP | 2002-227861 A | 8/2002 |
| JP | 201744268 U1 | 3/2017 |

\* cited by examiner

ROLLING BEARING

TECHNICAL FIELD

The present invention relates to a rolling bearing. The present application claims priority based on Japanese Patent Application No. 2019-177932 filed on Sep. 27, 2019, the entire contents of which are incorporated herein by reference.

BACKGROUND ART

A rolling bearing having rolling elements arranged on a single raceway and having two sets of rolling surfaces facing each other is known (see, for example, Patent Literature 1).

CITATION LIST

Patent Literature

Patent Literature 1: Japanese Patent Application Laid-Open No. 2017-044268

SUMMARY OF INVENTION

Technical Problem

It is preferable for the above rolling bearing to be light in weight. The above rolling bearing may be required to be reduced in size in the axial direction. The above rolling bearing is preferably reduced in production cost. It is preferable to reduce the entry of foreign matter into a space sandwiched between the outer ring and the inner ring and to reduce the leakage of the lubricant from inside.

Therefore, one of the objects is to provide a rolling bearing, having rolling elements arranged on a single raceway and two sets of rolling surfaces facing each other, which can achieve weight reduction as well as downsizing in the axial direction and also reduce the production cost while reducing the entry of foreign matter into a space sandwiched between the outer ring and the inner ring and the leakage of the lubricant from inside.

Solution to Problem

A rolling hearing according to the present disclosure includes: an outer ring; an inner ring arranged on an inner circumferential side of the outer ring; a plurality of rolling elements arranged to be capable of rolling on an inner circumferential surface of the outer ring and an outer circumferential surface of the inner ring; and an annular seal member arranged to extend along a boundary of a first space with an outside, the first space being an annular space between the outer ring and the inner ring. The outer ring includes a first outer ring made of a steel plate and having an annular first rolling surface that constitutes the inner circumferential surface of the outer ring, and a second outer ring made of a steel plate and having an annular second rolling surface that has a common central axis with the first rolling surface and constitutes the inner circumferential surface of the outer ring, the second outer ring being arranged alongside the first outer ring in a first axis direction in which the central axis of the first rolling surface extends and being fixed to the first outer ring. The inner ring includes a first inner ring made of a steel plate and having an annular third rolling surface that has a common central axis with the first rolling surface, opposes the second rolling surface, and constitutes the outer circumferential surface of the inner ring, and a second inner ring made of a steel plate and having an annular fourth rolling surface that has a common central axis with the first rolling surface, opposes the first rolling surface, and constitutes the outer circumferential surface of the inner ring, a line segment connecting the fourth rolling surface and the first rolling surface intersecting a line segment connecting the second rolling surface and the third rolling surface in a cross section including the central axis of the first rolling surface, the second inner ring being arranged alongside the first inner ring in the first axis direction and being fixed to the first inner ring. The seal member includes an annular base portion fixed to one bearing ring which is one of the outer and inner rings, and an annular protruding portion protruding from the base portion and extending toward a first region in another hearing ring which is the other of the outer and inner rings, the first region being a region opposing the one bearing ring.

According to the above-described rolling bearing, in the rolling bearing having rolling elements arranged on a single raceway and two sets of rolling surfaces facing each other, it is possible to achieve the weight reduction as well as downsizing in the axial direction and also reduce the production cost while reducing both the entry of foreign matter into the space sandwiched between the outer ring and the inner ring and the leakage of the lubricant from inside.

DESCRIPTION OF EMBODIMENTS

Outline of Embodiments

Figure 1:
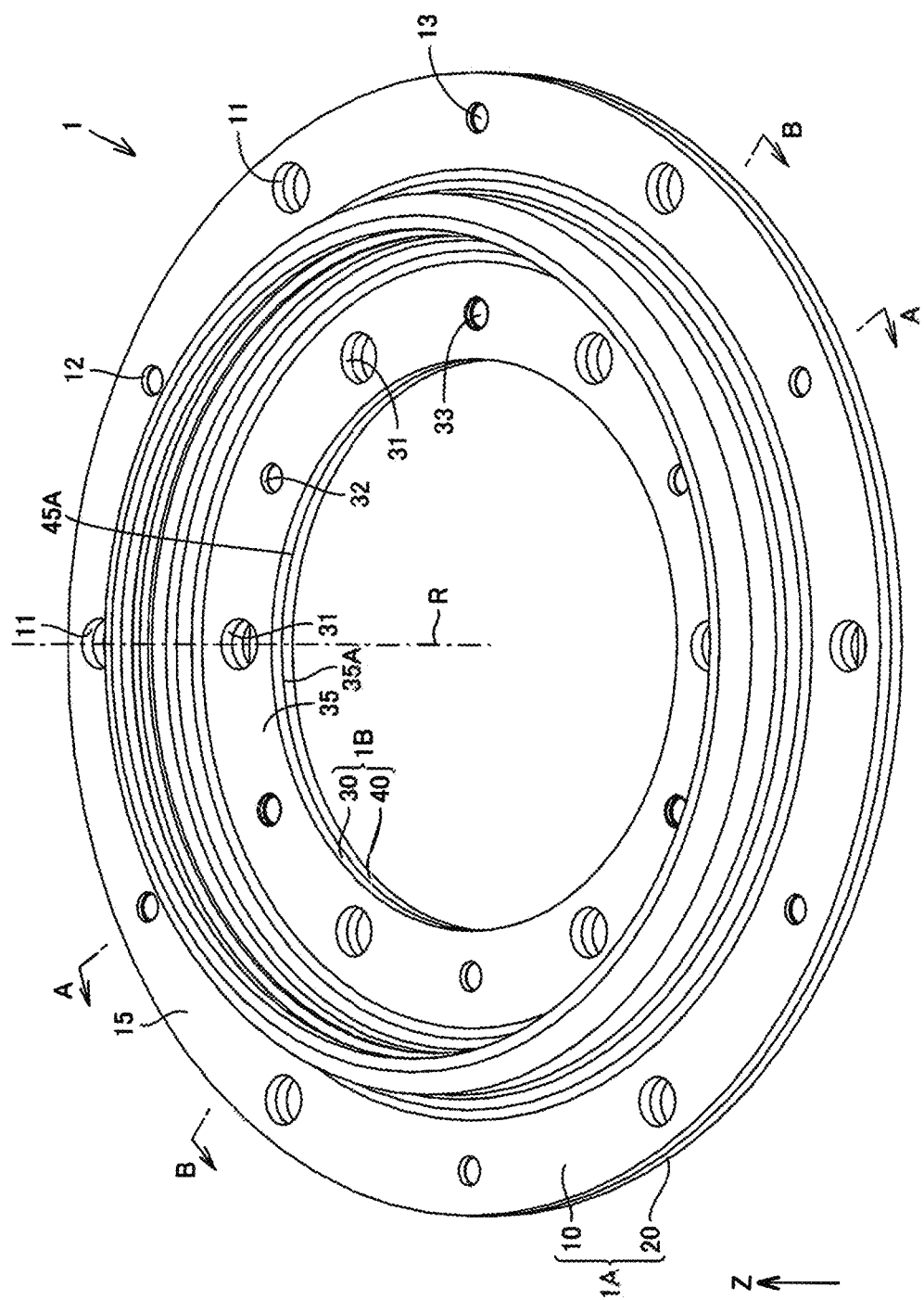
FIG. 1 is a schematic perspective view showing the structure of a rolling bearing in Embodiment 1.

A rolling bearing of the present disclosure includes: an outer ring; an inner ring arranged on an inner circumferential side of the outer ring; a plurality of rolling elements arranged to be capable of rolling on an inner circumferential surface of the outer ring and an outer circumferential surface of the inner ring; and an annular seal member arranged to extend along a boundary of a first space with an outside, the first space being an annular space between the outer ring and the inner ring. The outer ring includes a first outer ring made of a steel plate and having an annular first rolling surface that constitutes the inner circumferential surface of the outer ring, and a second outer ring made of a steel plate and having an annular second rolling surface that has a common central axis with the first rolling surface and constitutes the inner circumferential surface of the outer ring, the second outer ring being arranged alongside the first outer ring in a first axis direction in which the central axis of the first rolling surface extends and being fixed to the first outer ring. The inner ring includes a first inner ring made of a steel plate and having an annular third rolling surface that has a common central axis with the first rolling surface, opposes the second rolling surface, and constitutes the outer circumferential surface of the inner ring, and a second inner ring made of a steel plate and having an annular fourth rolling surface that has a common central axis with the first rolling surface, opposes the first rolling surface, and constitutes the outer circumferential surface of the inner ring, a line segment connecting the fourth rolling surface and the first rolling surface intersecting a line segment connecting the second rolling surface and the third rolling surface in a cross section including the central axis of the first rolling surface, the second inner ring being arranged alongside the first inner ring in the first axis direction and being fixed to the first inner ring. The seal member includes an annular base portion fixed to one bearing ring which is one of the outer and inner rings, and an annular protruding portion protruding from the base portion and extending toward a first region in another bearing ring which is the other of the outer and inner rings, the first region being a region opposing the one bearing ring.

The rolling bearing of the present disclosure includes the seal member. The seal member includes the base portion fixed to one bearing ring and the protruding portion extending toward the first region in the other raceway. The inclusion of such a seal member can reduce the entry of foreign matter into the first space and the leakage of the lubricant from inside. The first outer ring, the second outer ring, the first inner ring, and the second inner ring as described above can be formed by performing plastic working on steel plates. Therefore, the production cost of the rolling bearing can be reduced. Since the first outer ring, the second outer ring, the first inner ring, and the second inner ring are made of steel plates, the first outer ring, the second outer ring, the first inner ring, and the second inner ring can be reduced in weight and in thickness. This can achieve weight reduction as well as downsizing in the axis direction of the rolling bearing. As such, according to the rolling bearing of the present disclosure, in the rolling bearing having rolling elements arranged on a single raceway and two sets of rolling surfaces facing each other, weight reduction as well as downsizing in the axis direction can be achieved and the production cost can also be reduced, with the entry of foreign matter into the space sandwiched between the outer and inner rings and the leakage of the lubricant from inside being reduced.

In the above rolling bearing, the seal member may be made of an elastic member. The seal member may be formed integrally on the one bearing ring. Adopting such a configuration facilitates the assembly of the above rolling bearing. The seal member may be fixed to the one bearing ring via an adhesive.

In the above rolling bearing, the protruding portion may extend so as to be inclined toward an inside of the first space with respect to the first region. Adopting the above configuration in the seal member can further reduce the leakage of the lubricant from the inside.

In the above rolling bearing, the protruding portion may extend so as to be inclined toward an outside of the first space with respect to the first region. Adopting the above configuration in the seal member can further reduce the entry of foreign matter into the space sandwiched between the outer and inner rings.

In the above rolling bearing, the first outer ring may include a first portion having a disk annular shape, a second portion having a tubular shape and having an annular inner circumferential surface, the second portion extending from an inner edge of the first portion such that an inner diameter of the second portion decreases with increasing distance from the first portion in the first axis direction, and a third portion having a cylindrical shape, being connected to an end of the second portion opposite to the first portion in the first axis direction, and extending along the first axis direction. The second outer ring may include a fourth portion having a disk annular shape and being fixed to the first portion such that main surfaces thereof contact each other, a fifth portion having a tubular shape and having an annular inner circumferential surface, the fifth portion extending from an inner edge of the fourth portion to a side opposite to the second portion in the first axis direction, the fifth portion having an inner diameter decreasing with increasing distance from the fourth portion, and a sixth portion having a cylindrical shape, being connected to an end of the fifth portion opposite to the fourth portion in the first axis direction, and extending along the first axis direction to a side opposite to the third portion. The first inner ring may include a seventh portion having a disk annular shape, an eighth portion having a tubular shape and having an annular outer circumferential surface, the eighth portion extending from an outer edge of the seventh portion such that an outer diameter of the eighth portion increases with increasing distance from the seventh portion in the first axis direction, and a ninth portion having a cylindrical shape, being connected to an end of the eighth portion opposite to the seventh portion in the first axis direction, and extending along the first axis direction. The second inner ring may include a tenth portion having a disk annular shape and being fixed to the seventh portion such that main surfaces thereof contact each other, an eleventh portion having a tubular shape and having an annular outer circumferential surface, the eleventh portion extending from an outer edge of the tenth portion to a side opposite to the eighth portion in the first axis direction such that an outer diameter of the eleventh portion increases with increasing distance from the tenth portion, and a twelfth portion having a cylindrical shape, being connected to an end of the eleventh portion opposite to the tenth portion in the first axis direction, and extending along the first axis direction to a side opposite to the ninth portion. The inner circumferential surface of the second portion may include the first rolling surface. The inner circumferential surface of the fifth portion may include the second rolling surface. The outer circumferential surface of the eighth portion may include the third rolling surface. The outer circumferential surface of the eleventh portion may include the fourth rolling surface.

The first outer ring, the second outer ring, the first inner ring, and the second inner ring with such configurations can readily be produced, for example, by press forming steel plates. Therefore, the production cost of the rolling bearing can further be reduced.

In the above rolling bearing, the base portion may be fixed to one of the third portion and the ninth portion. The protruding portion may protrude toward the first region in the other of the third portion and the ninth portion. Adopting such a configuration can reduce the entry of foreign matter into the first space formed between the third portion and the ninth portion from the boundary of the first space with the outside, and also reduce the leakage of the lubricant therefrom.

In the above rolling bearing, the first outer ring may further include an annular bent portion arranged at an end of the third portion opposite to the second portion in the first axis direction and bent radially inward of the third portion to oppose the ninth portion. The base portion may be fixed to the ninth portion. The protruding portion may protrude toward the first region in the bent portion. The bent portion, the ninth portion, and the seal member form a labyrinth portion. This can further reduce the entry of foreign matter into the first space formed between the bent portion and the ninth portion from the boundary of the first space with the outside, and also further reduce the leakage of the lubricant from inside.

In the above rolling bearing, the first inner ring may further include an annular bent portion arranged at an end of the ninth portion opposite to the eighth portion in the first axis direction and bent radially outward of the ninth portion to oppose the third portion. The base portion may be fixed to the third portion. The protruding portion may protrude toward the first region in the bent portion. The bent portion, the third portion, and the seal member form a labyrinth portion. This can further reduce the entry of foreign matter into the first space formed between the bent portion and the third portion from the boundary of the first space with the outside, and also further reduce the leakage of the lubricant from inside.

In the above rolling bearing, the protruding portion may be arranged in the first space. Adopting such a configuration facilitates the assembly of the rolling bearing.

Description Of Specific Embodiments

Specific embodiments of the rolling bearing of the present disclosure will be described below with reference to the drawings. In the drawings referenced below, the same or corresponding portions are denoted by the same reference numerals and the description thereof will not be repeated.

Figure 2:
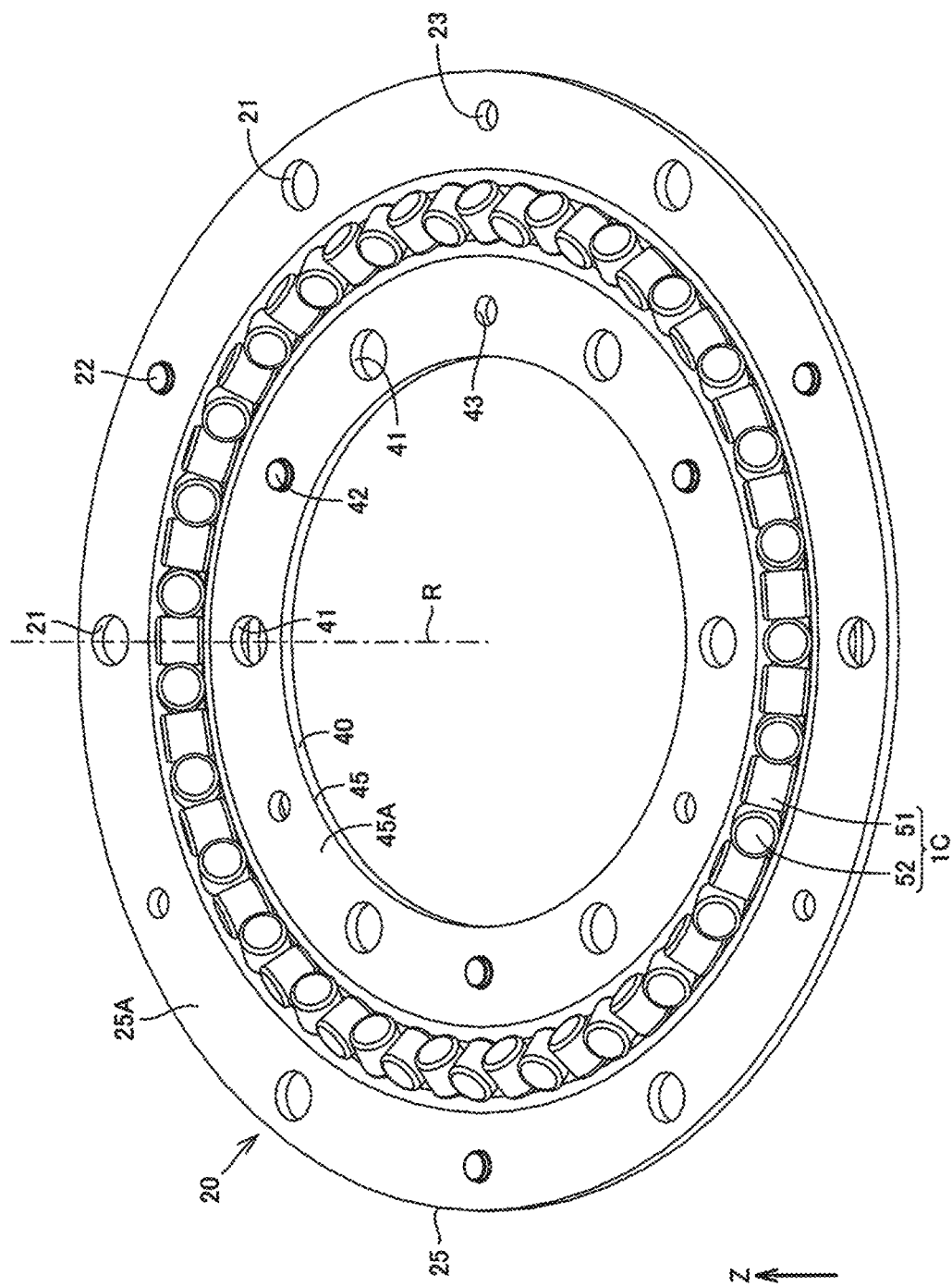
FIG. 2 is a schematic perspective view showing the structure of the rolling bearing with the first outer ring and the first inner ring removed.
Figure 3:
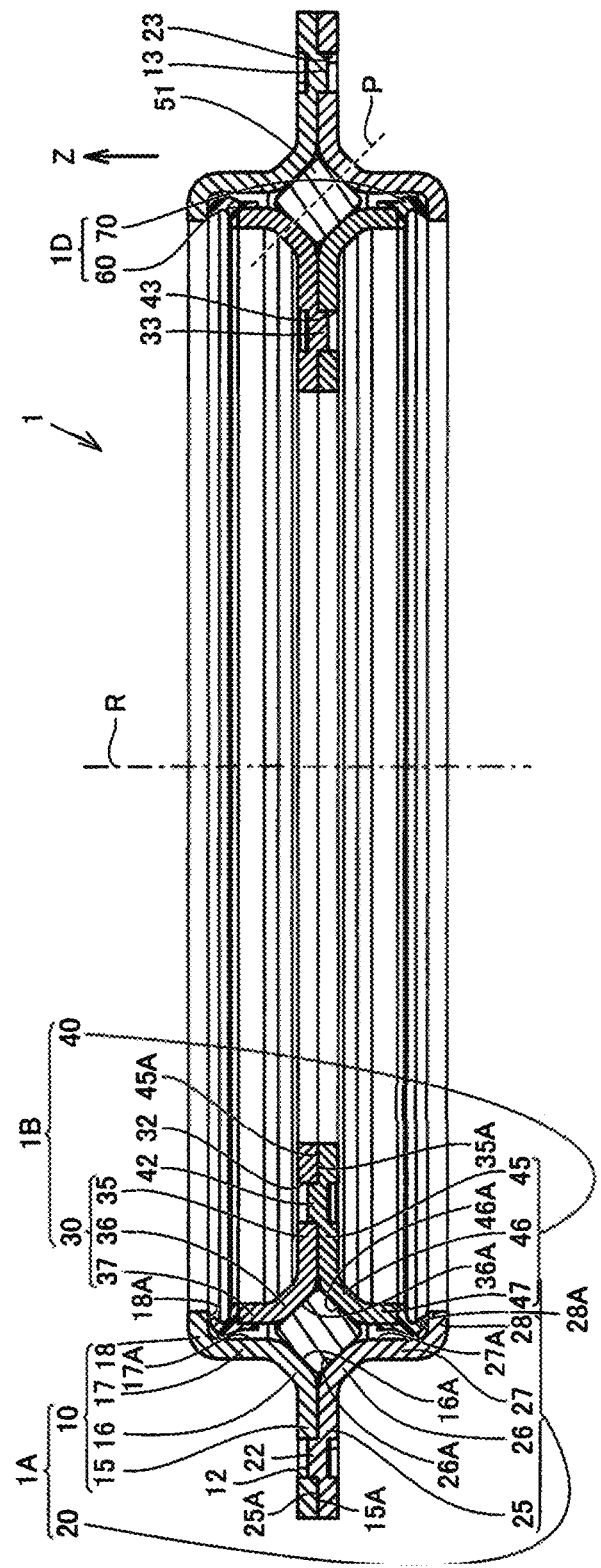
FIG. 3 is a schematic cross-sectional view showing the structure of the rolling hearing in Embodiment 1.
Figure 4:
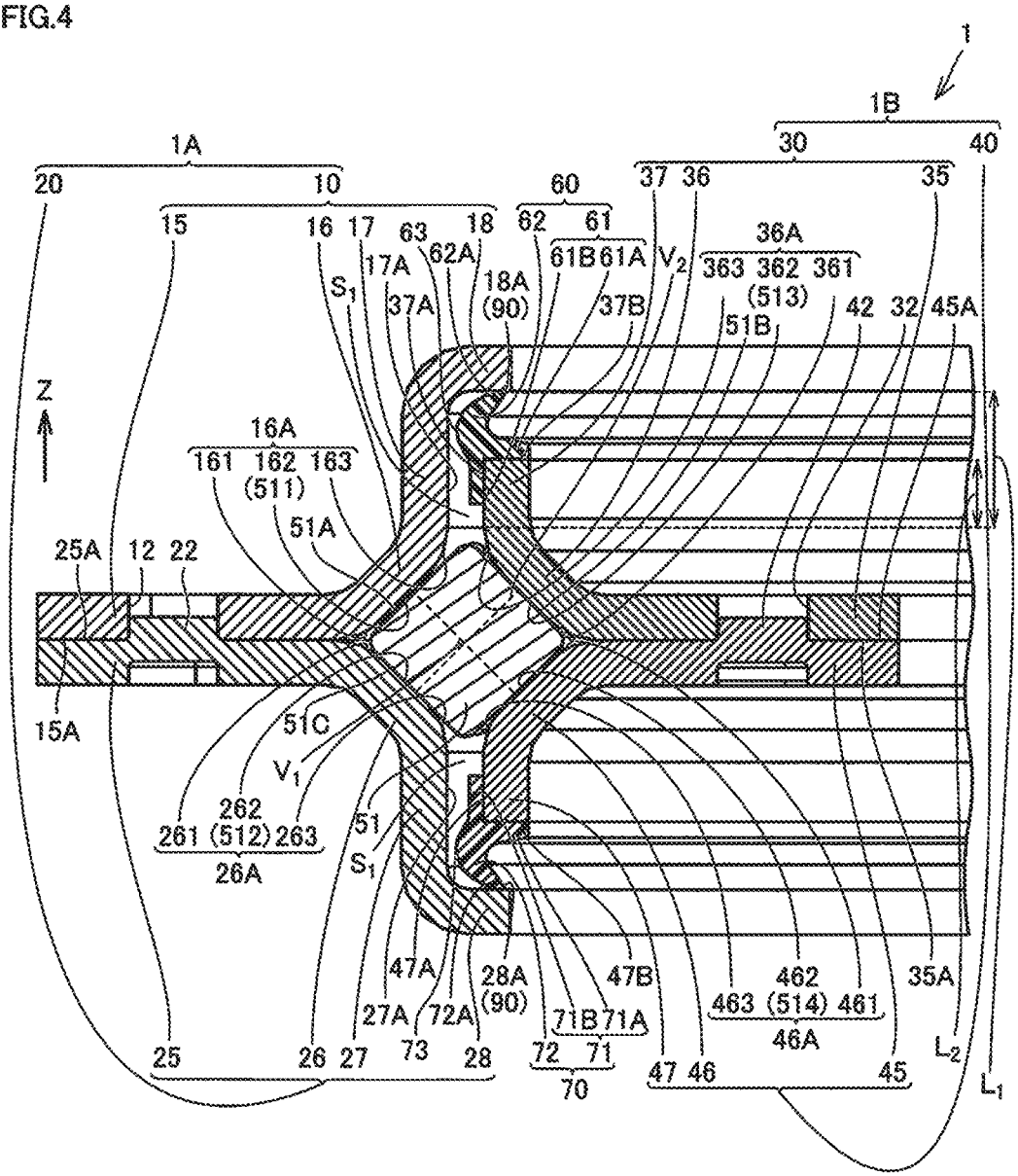
FIG. 4 is a schematic cross-sectional view showing the structure of the rolling bearing in Embodiment 1.

FIG. 1 is a schematic perspective view showing the structure of a rolling bearing in an embodiment of the present disclosure. The Z axis direction in FIG. 1 is a direction along a first axial direction in which a central axis R of the rolling bearing extends. FIG. 2 is a perspective view of the state where the first outer ring and the first inner ring in FIG. 1 have been removed. FIG. 3 is a cross-sectional view of the rolling bearing 1 when cut at A-A in FIG. 1. FIG. 3 is a cross-sectional view including the central axis of a first roller, which will be described later. FIG. 4 is a cross-sectional diagram showing, in an enlarged view, the area around the first roller in FIG. 3. Referring to FIGS. 1 and 3, the rolling bearing 1 in Embodiment 1 includes an outer ring 1A, which is a bearing ring, an inner ring 1B, which is a bearing ring, a plurality of rollers 1C as rolling elements (see particularly FIG. 2), and a seal member 1D. The outer ring 1A and the inner ring 1B are made of steel. The inner ring 1B is placed on an inner circumferential side of the outer ring 1A. In the present embodiment, the outer ring 1A and the inner ring 1B are made of steel plates that have been worked into a predetermined shape. In the present embodiment, the steel that constitutes the outer ring 1A and the inner ring 1B is, for example, SCM415 specified in JIS standard.

Referring to FIG. 1, the outer ring 1A includes an annular first outer ring 10 and an annular second outer ring 20. Referring to FIGS. 3 and 4, the first outer ring 10 includes a first portion 15, a second portion 16, a third portion 17, and a first bent portion 18. In the present embodiment, the first portion 15, the second portion 16, the third portion 17, and the first bent portion 18 have the same thickness. The first portion 15 has a disk annular shape. The first portion 15 has a common central axis with the central axis R of the rolling bearing 1. The second portion 16 has a tubular shape. The external shape of the second portion 16 is a truncated cone shape. The second portion 16 extends from an inner edge of the first portion 15 such that its inner diameter decreases with increasing distance from the first portion 15 in the Z axis direction. The second portion 16 has an annular inner circumferential surface 16A. The inner circumferential surface 16A has a common central axis with the central axis R of the rolling bearing 1. The third portion 17 has a cylindrical shape. The third portion 17 has a common central axis with the central axis R of the rolling bearing 1. The third portion 17 is connected to an end of the second portion 16 opposite to the first portion 15 in the Z axis direction and extends along the Z axis direction. The first bent portion 18 is arranged to be connected to an end of the third portion 17 opposite to the second portion 16 in the Z axis direction and to be bent radially inward of the third portion 17. The first bent portion 18 is arranged so as to oppose a ninth portion 37 in the Z axis direction. The first bent portion 18 has an annular shape. Referring to FIG. 4, the first bent portion 18 is arranged such that a portion of its one end face 18A in the Z axis direction and a portion of an end face 37B of the ninth portion 37 opposite to an eighth portion 36 in the Z axis direction oppose each other with a spacing therebetween in the Z axis direction. The above-described partial region of the end face 18A in the first bent portion 18 thus constitutes a first region 90.

Referring to FIG. 4, the inner circumferential surface 16A includes an annular first surface 161 as a first region 90, an annular second surface 162, and an annular third surface 163 as a third region. In the present embodiment, the first surface 161, the second surface 162, and the third surface 163 have a common central axis with the central axis R of the rolling bearing 1. The first surface 161 connects a surface 15A of the first portion 15 on the side in contact with a fourth portion 25 to the second surface 162. In the present embodiment, in a cross section including the central axis R, the first surface 161 has a curved shape. In the cross section including the central axis R, the second surface 162 has a flat shape. The third surface 163 connects the second surface 162 to an inner circumferential surface 17A of the third portion 17. In the present embodiment, in the cross section including the central axis R, the third surface 163 has a curved shape.

Referring to FIGS. 1 and 3, the first portion 15 has a plurality of (in the present embodiment, six) mounting holes 11, penetrating in the thickness direction (Z axis direction), formed at equal intervals in the circumferential direction. In the first portion 15, a through hole 12 and a protruding portion 13 are alternately formed in the circumferential direction between adjacent mounting holes 11 in the circumferential direction. A plurality of (in the present embodiment, three) through holes 12, penetrating in the thickness direction (Z axis direction), are formed at equal intervals in the circumferential direction. A plurality of (in the present embodiment, three) protruding portions 13, protruding in the thickness direction (Z axis direction) from the surface 15A of the first portion 15, are formed at equal intervals in the circumferential direction.

Referring to FIG. 1, the second outer ring 20 is arranged alongside the first outer ring 10 in the Z axis direction and is fixed to the first outer ring 10. Referring to FIGS. 3 and 4, the second outer ring 20 includes a fourth portion 25, a fifth portion 26, a sixth portion 27, and a second bent portion 28. In the present embodiment, the fourth portion 25, the fifth portion 26, the sixth portion 27, and the second bent portion 28 have the same thickness. In the present embodiment, the first portion 15 and the fourth portion 25 have the same thickness. The fourth portion 25 has a disk annular shape. The surface 15A of the first portion 15 is in contact with one surface 25A of the fourth portion 25. The fourth portion 25 has a common central axis with the central axis R of the rolling bearing 1. The fifth portion 26 has a tubular shape. The external shape of the fifth portion 26 is a truncated cone shape. The fifth portion 26 extends from an inner edge of the fourth portion 25 such that its inner diameter decreases with increasing distance from the fourth portion 25 in the Z axis direction. The fifth portion 26 extends to the opposite side of the second portion 16 in the Z axis direction. The fifth portion 26 has an inner circumferential surface 26A of an annular shape. The inner circumferential surface 26A has a common central axis with the central axis R of the rolling bearing 1. The sixth portion 27 has a cylindrical shape. The sixth portion 27 has a common central axis with the central axis R of the rolling bearing 1. The sixth portion 27 is connected to an end of the fifth portion 26 opposite to the fourth portion 25 in the Z axis direction and extends along the Z axis direction to the opposite side of the third portion 17. The second bent portion 28 is arranged to be connected to an end of the sixth portion 27 opposite to the fifth portion 26 in the Z axis direction and to be bent radially inward of the sixth portion 27. The second bent portion 28 is arranged to oppose a twelfth portion 47 in the Z axis direction. The second bent portion 28 has an annular shape. Referring to FIG. 4, a portion of one end face 28A of the second bent portion 28 in the Z axis direction and a portion of an end face 47B of the twelfth portion 47 opposite to an eleventh portion 46 in the Z axis direction are arranged to oppose each other with a spacing therebetween in the Z axis direction. The above-described partial region of the end face 28A in the second bent portion 28 constitutes the first region 90.

Referring to FIG. 4, the inner circumferential surface 26A includes an annular fourth surface 261 as a second region, an annular fifth surface 262, and an annular sixth surface 263. The fourth surface 261, the fifth surface 262, and the sixth surface 263 have a common central axis with the central axis R of the rolling bearing 1. The fourth surface 261 connects the surface 25A of the fourth portion 25 to the fifth surface 262. In the cross section including the central axis R, the fourth surface 261 has a curved shape. In the cross section including the central axis R, the fifth surface 262 has a flat shape. The sixth surface 263 connects the fifth surface 262 to an inner circumferential surface 27A of the sixth portion 27. In the cross section including the central axis R, the sixth surface 263 has a curved shape.

Referring to FIGS. 2 and 3, the fourth portion 25 has a plurality of (in the present embodiment six) mounting holes 21, penetrating in the thickness direction (Z axis direction), formed at equal intervals in the circumferential direction. In the fourth portion 25, a protruding portion and a through hole 23 are alternately formed in the circumferential direction between adjacent mounting holes 21 in the circumferential direction. A plurality of (in the present embodiment, three) protruding portions 22, protruding in the thickness direction (Z axis direction) from the surface 25A of the fourth portion 25, are formed at equal intervals in the circumferential direction. Each protruding portion 22 has a shape corresponding to the through hole 12. A plurality of (in the present embodiment, three) through holes 23, penetrating in the thickness direction (Z axis direction), are formed at equal intervals in the circumferential direction. Each through hole 23 has a shape corresponding to the protruding portion 13 (see FIG. 3).

Referring to FIG. 1, the inner ring 1B includes an annular first inner ring 30 and an annular second inner ring 40. Referring to FIGS. 3 and 4, the first inner ring 30 includes a seventh portion 35, an eighth portion 36, and a ninth portion 37. In the present embodiment, the seventh portion 35, the eighth portion 36, and the ninth portion 37 have the same thickness. In the present embodiment, the first portion and the seventh portion have the same thickness. The seventh portion 35 has a disk annular shape. The seventh portion 35 has a common central axis with the central axis R of the rolling bearing 1. The eighth portion 36 has a tubular shape. The external shape of the eighth portion 36 is a truncated cone shape. The eighth portion 36 extends from an outer edge of the seventh portion 35 such that its outer diameter decreases with increasing distance from the seventh portion 35 in the Z axis direction. The eighth portion 36 has an annular outer circumferential surface 36A. The outer circumferential surface 36A has a common central axis with the central axis R of the rolling bearing 1. The ninth portion 37 has a cylindrical shape. The ninth portion 37 has a common central axis with the central axis R of the rolling bearing 1. The ninth portion 37 is connected to an end of the eighth portion 36 opposite to the seventh portion 35 in the Z axis direction and extends along the Z axis direction. The ninth portion 37 has a length $L_2$ in the Z axis direction that is shorter than a length $L_1$ of the third portion 17 in the Z axis direction.

Referring to FIG. 4, the outer circumferential surface 36A includes an annular seventh surface 361, an annular eighth surface 362, and an annular ninth surface 363 as a fourth region. The seventh surface 361, the eighth surface 362, and the ninth surface 363 have a common central axis with the central axis R of the rolling bearing 1. The seventh surface 361 connects a surface 35A of the seventh portion 35 on the side in contact with a tenth portion 45 to the eighth surface 362. In the cross section including the central axis R, the seventh surface 361 has a curved shape. In the cross section including the central axis R, the eighth surface 362 has a flat shape. The eighth surface 362 opposes the fifth surface 262. In the present embodiment, in the cross section including the central axis R, the eighth surface 362 and the fifth surface 262 are arranged in parallel. The ninth surface 363 connects the eighth surface 362 to an outer circumferential surface 37A of the ninth portion 37. In the cross section including the central axis R, the ninth surface 363 has a curved shape.

Referring to FIGS. 1 and 3, the seventh portion 35 has a plurality of (in the present embodiment, six) mounting holes 31, penetrating in the thickness direction (Z axis direction), formed at equal intervals in the circumferential direction. In the seventh portion 35, a through hole 32 and a protruding portion 33 are alternately formed in the circumferential direction between adjacent mounting holes 31 in the circumferential direction. A plurality of (in the present embodiment, three) through holes 32, penetrating in the thickness direction (Z axis direction), are formed at equal intervals in the circumferential direction. A plurality of (in the present embodiment, three) protruding portions 33, protruding in the thickness direction (Z axis direction) from the surface 35A of the seventh portion 35, are formed at equal intervals in the circumferential direction.

Referring to FIG. 1, the second inner ring 40 is arranged alongside the first inner ring 30 in the Z axis direction and is fixed to the first inner ring 30. Referring to FIGS. 3 and 4, the second inner ring 40 includes a tenth portion 45, an eleventh portion 46, and a twelfth portion 47. In the present embodiment, the tenth portion 45, the eleventh portion 46, and the twelfth portion 47 have the same thickness. In the present embodiment, the first portion 15 and the tenth portion 45 have the same thickness. The tenth portion 45 has a disk annular shape. The surface 35A of the seventh portion is in contact with one surface 45A of the tenth portion 45. The tenth portion 45 has a common central axis with the central axis R of the rolling bearing 1. The eleventh portion 46 has a tubular shape. The external shape of the eleventh portion 46 is a truncated cone shape. The eleventh portion 46 extends from an outer edge of the tenth portion 45 such that its outer diameter increases with increasing distance from the tenth portion 45 in the Z axis direction. The eleventh portion 46 extends to the opposite side of the eighth portion 36 in the Z axis direction. The eleventh portion 46 has an annular outer circumferential surface 46A. The outer circumferential surface 46A has a common central axis with the central axis R of the rolling bearing 1. The twelfth portion 47 has a cylindrical shape. The twelfth portion 47 has a common central axis with the central axis R of the rolling bearing 1. The twelfth portion 47 is connected to an end of the eleventh portion 46 opposite to the tenth portion 45 in the Z axis direction and extends along the Z axis direction to the opposite side of the ninth portion 37.

Referring to FIG. 4, the outer circumferential surface 46A includes an annular tenth surface 461, an annular eleventh surface 462, and an annular twelfth surface 463. The tenth surface 461, the eleventh surface 462, and the twelfth surface 463 have a common central axis with the central axis R of the rolling bearing 1. The tenth surface 461 connects the surface 45A of the tenth portion 45 on the side in contact with the seventh portion 35 to the eleventh surface 462. In the cross section including the central axis R, the tenth surface 461 has a curved shape. In the cross section including the central axis R, the eleventh surface 462 has a flat shape. The eleventh surface 462 opposes the second surface 162. In the present embodiment, in the cross section including the central axis R, the eleventh surface 462 and the second surface 162 are arranged in parallel. In the cross section including the central axis R, a line segment $V_1$ connecting the second surface 162 and the eleventh surface 462 intersects (is orthogonal to) a line segment $V_2$ connecting the fifth surface 262 and the eighth surface 362. The twelfth surface 463 connects the eleventh surface 462 to an outer circumferential surface 47A of the twelfth portion 47. In the cross section including the central axis R, the twelfth surface 463 has a curved shape.

Referring to FIGS. 2 and 3, the tenth portion 45 has a plurality of (in the present embodiment, six) mounting holes 41, penetrating in the thickness direction (Z axis direction), formed at equal intervals in the circumferential direction. In the tenth portion 45, a protruding portion 42 and a through hole 43 are alternately formed between adjacent mounting holes 41 in the circumferential direction. A plurality of (in the present embodiment three) protruding portions 42, protruding in the thickness direction (Z axis direction) from the surface 45A of the tenth portion 45, are formed at equal intervals in the circumferential direction. Each protruding portion 42 has a shape corresponding to the through hole 32. A plurality of (in the present embodiment, three) through holes 43, penetrating in the thickness direction (Z axis direction), are formed at equal intervals in the 31) circumferential direction. Each through hole 43 has a shape corresponding to the protruding portion 33.

Figure 5:
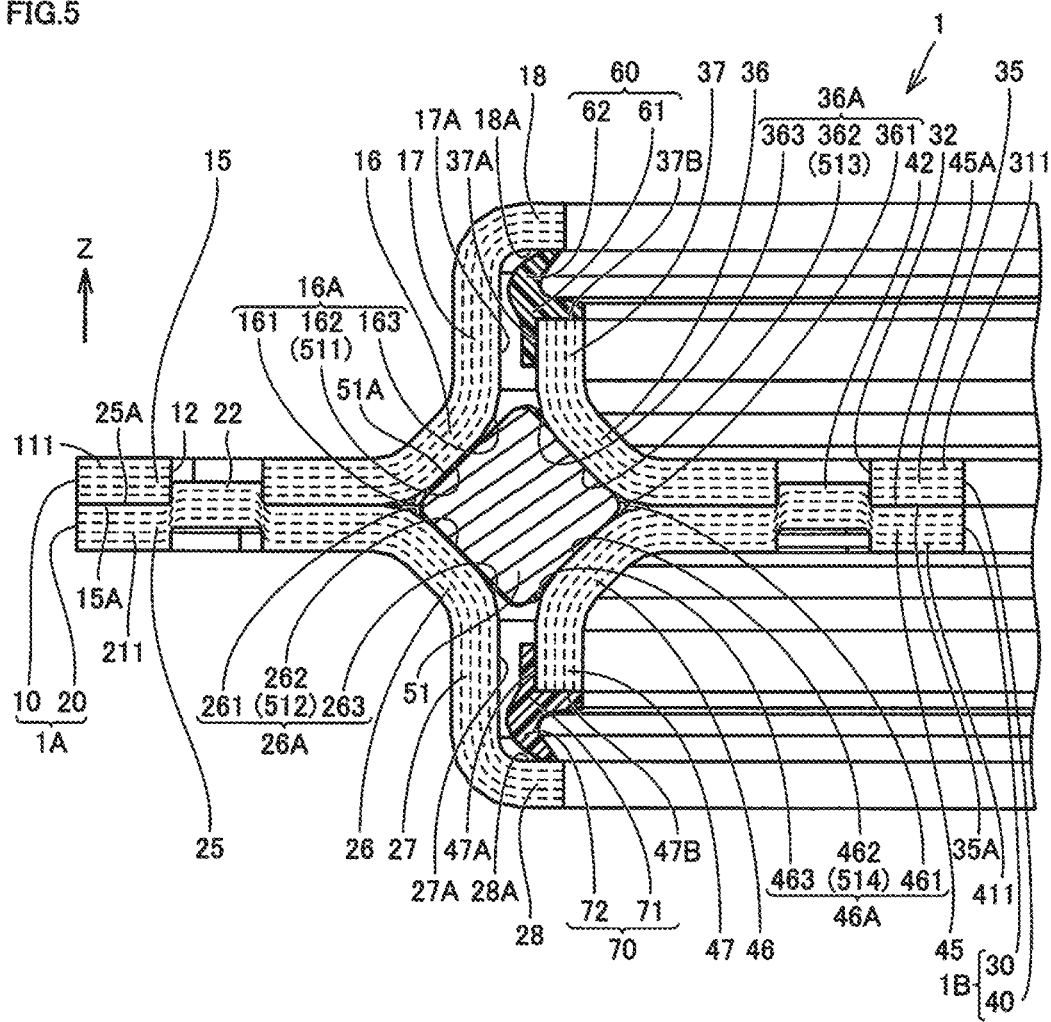
FIG. 5 is a schematic diagram illustrating the state of grain flows in the outer and inner rings.

FIG. 5 is a diagram illustrating grain flows in a cross section of the rolling bearing 1 when cut at A-A in FIG. 1. Referring to FIG. 5, in the first outer ring 10, grain flows 111 in the steel that constitutes the first outer ring 10 extend along the surface 15A of the first portion 15, the inner circumferential surface 16A of the second portion 16, the inner circumferential surface 17A of the third portion 17, and the end face 18A of the first bent portion 18. The grain flows 111 extend along the first surface 161, the second surface 162, and the third surface 163 of the inner circumferential surface 16A. In the present embodiment, the grain flows 111 extend parallel to the second surface 162. In the second outer ring 20, grain flows 211 in the steel that constitutes the second outer ring 20 extend along the surface 25A of the fourth portion 25, the inner circumferential surface 26A of the fifth portion 26, the inner circumferential surface 27A of the sixth portion 27, and the second bent portion 28. The grain flows 211 extend along the fourth surface 261, the fifth surface 262, and the sixth surface 263 of the inner circumferential surface 26A. In the present embodiment, the grain flows 211 extend parallel to the fifth surface 262. In the first inner ring 30, grain flows 311 in the steel that constitutes the first inner ring 30 extend along the surface 35A of the seventh portion 35, the outer circumferential surface 36A of the eighth portion 36, and the outer circumferential surface 37A of the ninth portion 37. The grain flows 311 extend along the seventh surface 361, the eighth surface 362, and the ninth surface 363 of the outer circumferential surface 36A. In the present embodiment, the grain flows 311 extend parallel to the eighth surface 362. In the second inner ring 40, grain flows 411 in the steel that constitutes the second inner ring 40 extend along the surface 45A of the tenth portion 45, the outer circumferential surface 46A of the eleventh portion 46, and the outer circumferential surface 47A of the twelfth portion 47. The grain flows 411 extend along the tenth surface 461, the eleventh surface 462, and the twelfth surface 463 of the outer circumferential surface 46A. In the present embodiment, the grain flows 411 extend parallel to the eleventh surface 462.

Referring to FIG. 2, the plurality of rollers 1C include a plurality of first rollers 51 and a plurality of second rollers 52. In the present embodiment, the first rollers 51 and the second rollers 52 are made of steel. In the present embodiment, the first rollers 51 and the second rollers 52 are made of, for example, SUJ2 specified in JIS standard. In the present embodiment, the rollers 1C include 27 first rollers 51 and 27 second rollers 52. The first rollers 51 and the second rollers 52 have a cylindrical shape. The first rollers 51 and the second rollers 52 are arranged alternately in the circumferential direction. Referring to FIG. 4, the first rollers 51 are disposed such that they can roll while contacting the second surface 162 and the eleventh surface 462 at their outer circumferential surfaces 51A. The second surface 162 constitutes a first rolling surface 511. The eleventh surface 462 constitutes a fourth rolling surface 514. The first rolling surface 511 and the fourth rolling surface 514 have a common central axis with the central axis R of the rolling bearing 1. Each first roller 51 has one end face 51B in the axial direction that is opposite to the eighth surface 362. The other end face 51C in the axial direction of the first roller 51 is in contact with the fifth surface 262.

Figure 6:
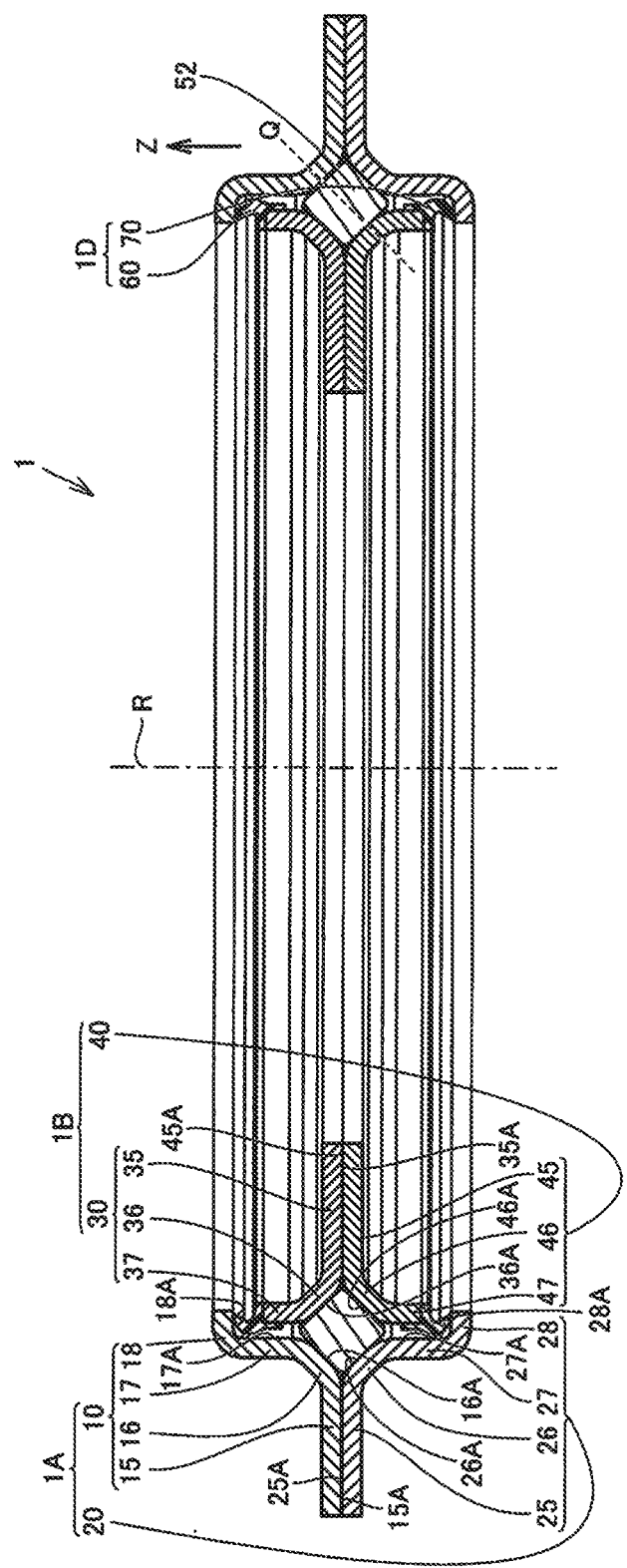
FIG. 6 is a schematic cross-sectional view showing the structure of the rolling bearing in Embodiment 1.
Figure 7:
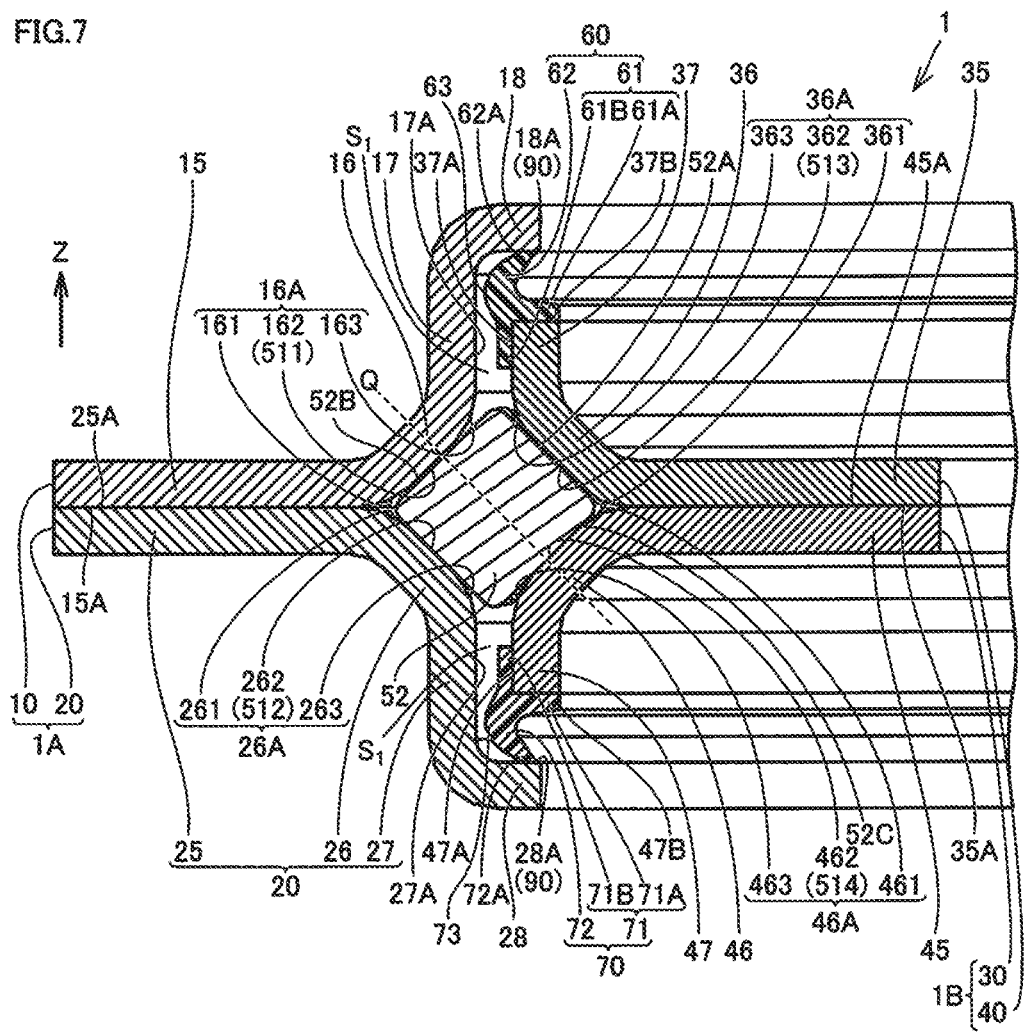
FIG. 7 is a schematic cross-sectional view showing the structure of the rolling bearing in Embodiment 1.

FIG. 6 is a cross-sectional view of the rolling bearing 1 when cut at B-B in FIG. 1. FIG. 6 is a cross section including the central axis of a second roller 52, which will be described below. FIG. 7 is a cross-sectional diagram showing, in an enlarged view, the area around the second roller in FIG. 6. Referring to FIG. 7, the second rollers 52 are disposed such that they can roll while contacting the fifth surface 262 and the eighth surface 362 at their outer circumferential surfaces 52A. The fifth surface 262 constitutes a second rolling surface 512. The eighth surface 362 constitutes a third rolling surface 513. The second rolling surface 512 and the third rolling surface 513 have a common central axis with the central axis R of the rolling bearing 1. Each second roller 52 has one end face 52B in the axial direction that is in contact with the second surface 162. The other end face 52C in the axial direction of the second roller 52 is opposite to the eleventh surface 462. Referring to FIGS. 3 and 6, the first roller 51 has a central axis P that intersects (is orthogonal to) a central axis Q of the second roller 52. Here, the state in which the central axis P of the first roller 51 intersects the central axis Q of the second roller 52 means that when the center of gravity of the first roller 51 and the second roller 52 passes through a predetermined point during rotation of the rolling bearing 1, the central axis P of the first roller 51 and the central axis Q of the second roller 52 intersect with (are orthogonal to) each other.

Referring to FIG. 3, the seal member 1D includes a first seal member 60 and a second seal member 70. The seal member 1D is made of an elastic member. In the present embodiment, the seal member 1D is made of rubber. In the present embodiment, the material constituting the seal member 1D is nitrile rubber. Referring to FIG. 4, the first seal member 60 includes an annular base portion 61 and an annular protruding portion 62. The first seal member 60 is disposed so as to extend along a boundary between a first space $S_1$, i.e. a space sandwiched between the first and second outer rings 10 and 20 and the first and second inner rings 30 and 40, and the outside in the present embodiment, the first seal member 60 is formed integrally on the first inner ring 30. The first seal member 60 and the first inner ring 30 can be produced by various known forming methods (for example, insert molding). The base portion 61 includes an end face contact portion 61A and a side surface contact portion 61B. The base portion 61 is fixed to the ninth portion 37. The end face contact portion 61A is in contact with an end face 37A of the ninth portion 37. The side surface contact portion 61B is in contact with the outer circumferential surface 37A of the ninth portion 37. With such a configuration adopted, the base portion 61 has sufficient adhesion strength to the ninth portion 37. With the base portion 61 included, sufficient adhesion strength between the first inner ring 30 and the seal member 1D is ensured. The protruding portion 62 protrudes from the base portion 61. The protruding portion 62 protrudes toward the end face 18A of the first bent portion 18. The protruding portion 62 extends so as to be inclined toward the outside of the first space $S_1$ with respect to the end face 18A of the first bent portion 18. The protruding portion 62 has a tip end portion 62A that contacts the end face 18A of the first bent portion 18. In the present embodiment the protruding portion 62 is located only in the first space $S_1$. The protruding portion 62 has a convex portion 63 that protrudes radially outward. A distance in the radial direction between the convex portion 63 and the third portion 17 is smaller than a distance in the radial direction between the other portion of the first seal member 60 and the third portion 17. A labyrinth portion is thus formed by the convex portion 63 and the third portion 17.

The second seal member 70 includes a base portion 71 and a protruding portion 72. In the present embodiment, the second seal member 70 and the second inner ring 40 are formed integrally. The second seal member 70 and the second inner ring 40 can be produced by various known forming methods (for example, insert molding). The base portion 71 includes an end face contact portion 71A and a side surface contact portion 71B. The base portion 71 is fixed to the twelfth portion 47. The end face contact portion 71A is in contact with the end face 47B of the twelfth portion 47. The side surface contact portion 71B extends along the Z axis direction from an outer edge of the end face contact portion 71A. The side surface contact portion 71B is in contact with the outer circumferential surface 47A of the twelfth portion 47. The protruding portion 72 protrudes from the base portion 71. The protruding portion 72 protrudes toward the second bent portion 28. The protruding portion 72 extends along the Z axis direction from an end face of the end face contact portion 71A opposite to the side surface contact portion 71B. The protruding portion 72 extends so as to be inclined toward the outside of the first space $S_1$ with respect to the end face 28A of the second bent portion 28. The protruding portion 72 has a tip end portion 72A that contacts the end face 28A of the second bent portion 28. In the present embodiment, the protruding portion 72 is located only in the first space $S_1$. The protruding portion 72 has a convex portion 73 that protrudes radially outward. A distance in the radial direction between the convex portion 73 and the sixth portion 27 is smaller than a distance in the radial direction between the other portion of the second seal member 70 and the sixth portion 27. A labyrinth portion is thus formed by the convex portion 73 and the sixth portion 27.

A description will now be made of a method for producing the rolling bearing 1 in the present embodiment. First, a first steel plate, a second steel plate, a third steel plate, and a fourth steel plate having a flat plate shape are prepared. Next, the first steel plate, the second steel plate, the third steel plate, and the fourth steel plate are each subjected to press working. In this manner, the first outer ring 10 and the second outer ring 20 having the shapes shown in FIGS. 1 and 2 are formed. Next, the third steel plate and the fourth steel plate that have undergone the press working are placed in respective molds, and nitrite rubber is poured into the molds to form a member with the first seal member 60 and the first inner ring 30 integrally formed, and a member with the second seal member 70 and the second inner ring 40 integrally formed. In this manner, the first inner ring 30 and the second inner ring 40 having the shapes shown in FIGS. 1 and 2 are formed. Next, the second inner ring 40 is attached to the first inner ring 30 to form the inner ring 1B. More specifically, the protruding portions 33 are fitted into the through holes 43 and the protruding portions 42 are fitted into the through holes 32. The inner ring 1B thus formed and the second outer ring 20 are attached to a jig. At this time, they are attached such that the outer circumferential surface 47A of the twelfth portion 47 and the inner circumferential surface 27A of the sixth portion 27 oppose each other and that the end face 28A of the second bent portion 28 and the end face 47B of the twelfth portion oppose each other (see FIG. 4). Next, the first rollers 51 and the second rollers 52 are arranged alternately in the space sandwiched between the inner ring 1B and the second outer ring 20. Next, the first outer ring 10 is attached to the second outer ring 20 to form the outer ring 1A. More specifically, the protruding portions 13 are fitted into the through holes 23 and the protruding portions 22 are fitted into the through holes 12.

Figure 8:
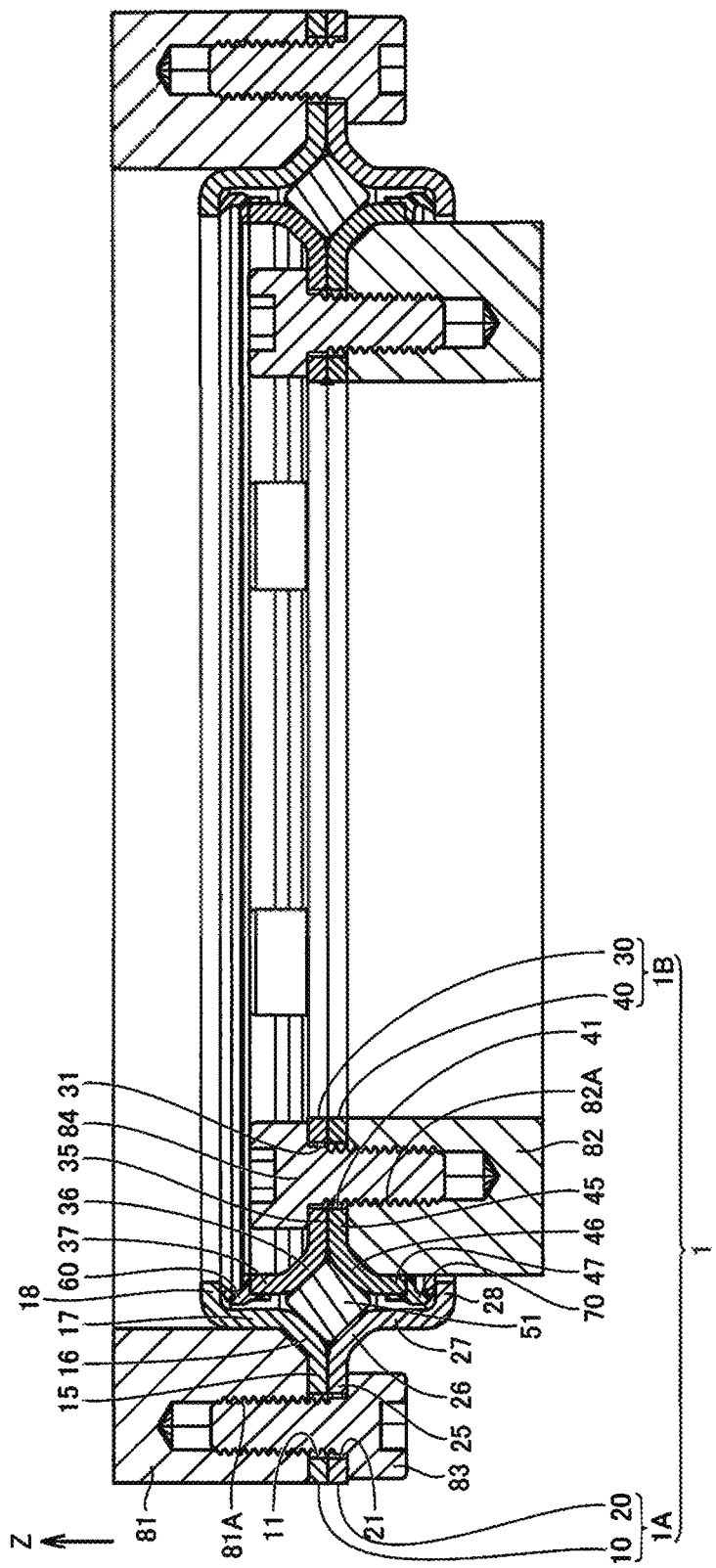
FIG. 8 is a schematic cross-sectional view showing the use state of the rolling bearing in Embodiment 1.

A description will now be made of an exemplary way of using the rolling bearing 1 in the present embodiment. Referring to FIG. 8, the first outer ring 10 and the second outer ring 20 are fixed to a ring-shaped first member 81. The first member 81 has a plurality of screw holes 81A, each surrounded by a wall surface with helical screw grooves, formed at equal intervals in the circumferential direction. The screw holes 81A have a shape corresponding to the mounting holes 11 and 21. They are arranged such that the positions where the screw holes 81A are formed coincide with the positions where the mounting holes 11, 21 are formed, and screws 83 are screwed into the holes. The first inner ring 30 and the second inner ring 40 are fixed to a ring-shaped second member 82. The second member 82 has a plurality of screw holes 82A, each surrounded by a wall surface with helical screw grooves, formed at equal intervals in the circumferential direction. The screw holes 82A have a shape corresponding to the mounting holes 31 and 41. They are arranged such that the positions where the screw holes 82A are formed coincide with the positions where the mounting holes 31, 41 are formed, and screws 84 are screwed into the holes. With the rolling bearing 1 installed in this manner, the second member 82 is supported with respect to the first member 81 so as to be rotatable in the circumferential direction.

Here, the rolling bearing 1 in the present embodiment includes the seal member 1D. The inclusion of the seal member 1D can reduce the entry of foreign matter into the first space $S_1$ and the leakage of the lubricant from within the first space $S_1$. The first outer ring 10, the second outer ring 20, the first inner ring 30, and the second inner ring 40 can be formed by performing plastic working (for example, press working in the present embodiment) on the steel plates. Since the first outer ring 10, the second outer ring 20, the first inner ring 30, and the second inner ring 40 are made of steel plates, the first outer ring 10, the second outer ring 20, the first inner ring 30, and the second inner ring 40 can be reduced in weight and in thickness. Therefore, in the rolling bearing 1 in the present embodiment, weight reduction and downsizing in the axial direction are achieved and the production cost is also reduced, with the entry of foreign matter into the first space $S_1$ and the leaking of the lubricant from within the first space $S_1$ being reduced.

In the above embodiment, the first seal member 60 and the second seal member 70 are made of elastic members. The first seal member 60 and the second seal member 70 are integrally formed on the first inner ring 30 and the second inner ring 40, respectively. Adopting such a configuration facilitates the assembly of the rolling bearing 1. Further, in addition to the first seal member 60 and the second seal member 70 being integrally formed on the first inner ring 30 and the second inner ring 40, respectively, an adhesive may be applied to cover the area around the regions where the first seal member 60 and the second seal member 70 are in contact with the first inner ring 30 and the second inner ring 40. Such a configuration can enhance the state of adhesion between the first and second seal members 60 and 70 and the first and second inner rings 30 and 40.

In the above embodiment, the case where the first seal member 60 and the second seal member 70 are integrally formed on the first inner ring 30 and the second inner ring 40, respectively, has been described. However, the first seal member 60 and the second seal member 70 may be fixed to the first inner ring 30 and the second inner ring 40 via an adhesive.

In the above embodiment, the protruding portions 62 and 72 extend so as to be inclined toward the outside of the first space $S_1$ with respect to the end face 18A of the first bent portion 18 and the end face 28A of the second bent portion 28. Adopting the above configuration in the seal member 1D can further reduce the entry of foreign matter into the first space $S_1$.

In the above embodiment, the first outer ring 10 includes the first portion 15, the second portion 16, the third portion 17, and the first bent portion 18. The second outer ring 20 includes the fourth portion 25, the fifth portion 26, the sixth portion 27, and the second bent portion 28. The first inner ring 30 includes the seventh portion 35, the eighth portion 36, and the ninth portion 37. The second inner ring 40 includes the tenth portion 45, the eleventh portion 46, and the twelfth portion 47. The first outer ring 10, the second outer ring 20, the first inner ring 30, and the second inner ring 40 of such configurations can readily be produced, for example, by press forming the steel plates. Accordingly, the production cost of the rolling bearing 1 can further be reduced.

In the above embodiment, the first outer ring 10 includes the first bent portion 18. The base portion 61 of the first seal member 60 is fixed to the ninth portion 37. The protruding portion 62 protrudes toward the end face 18A of the first bent portion 18. The second outer ring 20 includes the second bent portion 28. The base portion 71 of the second seal member 70 is fixed to the twelfth portion 47. The protruding portion 72 protrudes toward the end face 28A of the second bent portion 28. The first bent portion 18, the ninth portion 37, and the first seal member 60 form a labyrinth portion. Similarly the second bent portion 28, the twelfth portion 47, and the second seal member 70 form a labyrinth portion. As a result, it is possible to reduce the entry of foreign matter into the first space $S_1$ formed between the first and second bent portions 18 and 28 and the ninth and twelfth portions 37 and 47 from the boundary of the first space $S_1$ with the outside, and further reduce the leakage of the lubricant from within the first space $S_1$.

In the above embodiment, the first seal member 60 and the second seal member 70 have convex portions 63 and 73, respectively. Adopting such a configuration can further reduce the entry of foreign matter into the first space $S_1$ and further reduce the leakage of the lubricant from within the first space.

In the above embodiment, the case where the first outer ring 10 includes the first bent portion 18 and the second outer ring 20 includes the second bent portion 28 has been described. However, not limited to this case, either one of the first outer ring 10 and the second outer ring 20 may include the bent portion. In the above embodiment, the case where the tip end portion 62A of the protruding portion 62 in the first seal member 60 and the tip end portion 72A of the protruding portion 72 in the second seal member 70 come into contact with the end face 18A of the first bent portion 18 and the end face 28A of the second bent portion 28, respectively, has been described. However, not limited to this case, the tip end portions 62A, 72A and the end faces 18A, 28A may be arranged to oppose each other with a small spacing therebetween in the Z axis direction. In the above embodiment, the case where the material constituting the seal member 1D is nitrile rubber has been described. However, not limited to this case, the material may be hydrogenated nitrile rubber, fluororubber, silicone rubber, or the like. The material constituting the seal member 1D may be, for example, resin or elastomer. In the above embodiment, the case where rollers 1C are adopted as the rolling elements has been described. However, not limited to this case, balls may be adopted as the rolling elements. In order to maintain a first roller 51 and a second roller 52 at a predetermined interval, a separator may be disposed between the first and second rollers 51 and 52. A retainer may be disposed to maintain the first rollers 51 and the second rollers 52 at predetermined intervals.

In the above embodiment, the protruding portions 62 and 72 are disposed only in the first space $S_1$. Adopting such a configuration can suppress the exposure of the protruding portions 62 and 72 to the outside. This facilitates the assembly of the rolling bearing 1.

Variation

Figure 9:
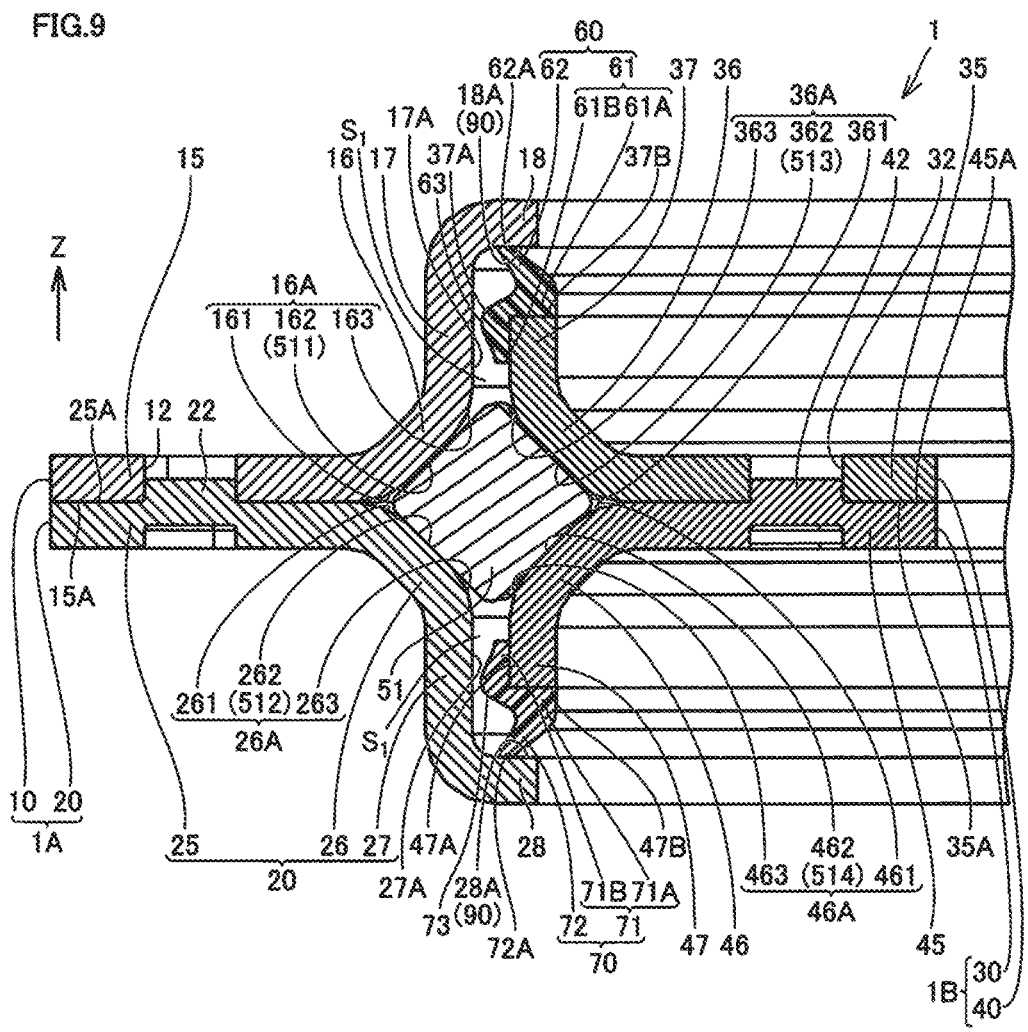
FIG. 9 is a schematic cross-sectional view showing a variation of the rolling bearing in Embodiment 1.

A description will now be made of a variation of the rolling bearing 1 in Embodiment 1. Referring to FIG. 9, the base portion 61 of the first seal member 60 in the present variation includes the end face contact portion 61A and the side surface contact portion 61B. The protruding portion 62 extends so as to be inclined toward the inside of the first space $S_1$ with respect to the end face 18A of the first bent portion 18. The protruding portion 62 has its outer and inner diameters increasing as it approaches the end face 18A of the first bent portion 18 in the Z axis direction. The base portion 61 has a convex portion 63 that protrudes radially outward. A distance in the radial direction between the convex portion 63 and the third portion 17 is smaller than a distance in the radial direction between the other portion of the first seal member 60 and the third portion 17. Therefore, a labyrinth portion is formed by the convex portion 63 and the third portion 17. The base portion 71 of the second seal member 70 includes the end face contact portion 71A and the side surface contact portion 71B. The protruding portion 72 extends so as to be inclined toward the inside of the first space $S_1$ with respect to the end face 28A of the second bent portion 28. The protruding portion 72 has its outer and inner diameters increasing as it approaches the end face 28A of the second bent portion 28 in the Z axis direction. The base portion 71 has a convex portion 73 that protrudes radially outward. A distance in the radial direction between the convex portion 73 and the sixth portion 27 is smaller than a distance in the radial direction between the other portion of the second seal member 70 and the sixth portion 27. Therefore, a labyrinth portion is formed by the convex portion 73 and the sixth portion 27.

In the present variation, the protruding portion 62 of the first seal member 60 extends so as to be inclined toward the inside of the first space $S_1$ with respect to the end face 18A of the first bent portion 18. The protruding portion 72 of the second seal member 70 extends so as to be inclined toward the inside of the first space $S_1$ with respect to the end face 28A of the second bent portion 28. Adopting the above configurations in the first seal member 60 and the second seal member 70 can further reduce the leakage of the lubricant from within the first space $S_1$.

Embodiment 2

A description will now be made of Embodiment 2 of the rolling bearing 1 of the present disclosure. The rolling bearing 1 in Embodiment 2 basically has a similar structure and produces similar effects as the rolling bearing 1 in Embodiment 1. However, Embodiment 2 differs from Embodiment 1 in that it has no labyrinth portion. The points that are different from the case of Embodiment 1 will mainly be described below.

Figure 10:
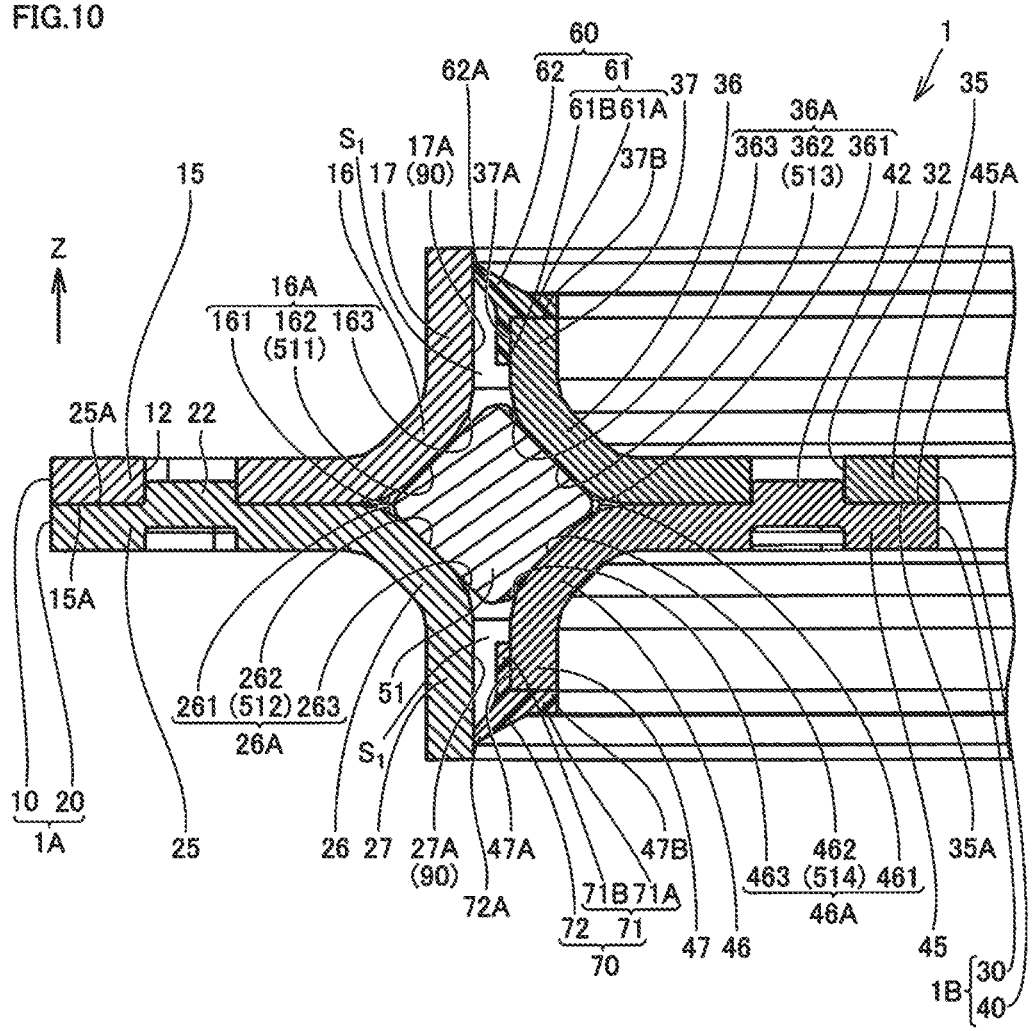
FIG. 10 is a schematic cross-sectional view showing the structure of a rolling bearing in Embodiment 2.

Referring to FIG. 10, the protruding portion 62 protrudes toward the inner circumferential surface 17A of the third portion 17. The protruding portion 62 extends so as to be inclined toward the outside of the first space $S_1$ with respect to the inner circumferential surface 17A. The protruding portion 62 has its outer and inner diameters increasing as it approaches the inner circumferential surface 17A. The protruding portion 62 has a tip end portion 62A that contacts the inner circumferential surface 17A. The protruding portion 72 protrudes toward the inner circumferential surface 27A of the sixth portion 27. The protruding portion 72 extends so as to be inclined toward the inside of the first space $S_1$ with respect to the inner circumferential surface 27A. The protruding portion 72 has a tip end portion 72A that contacts the inner circumferential surface 27A. With the protruding portions 62, 72 extending so that they are inclined toward the outside of the first space $S_1$ with respect to the inner circumferential surfaces 17A, 27A, the entry of foreign matter into the first space $S_1$ can further be reduced.

The rolling bearing 1 of Embodiment 2 above, as with Embodiment 1, can achieve weight reduction as well as downsizing in the axial direction and also reduce the production cost, while reducing both the entry of foreign matter into the first space $S_1$ and the leakage of the lubricant from inside.

Variation

Figure 11:
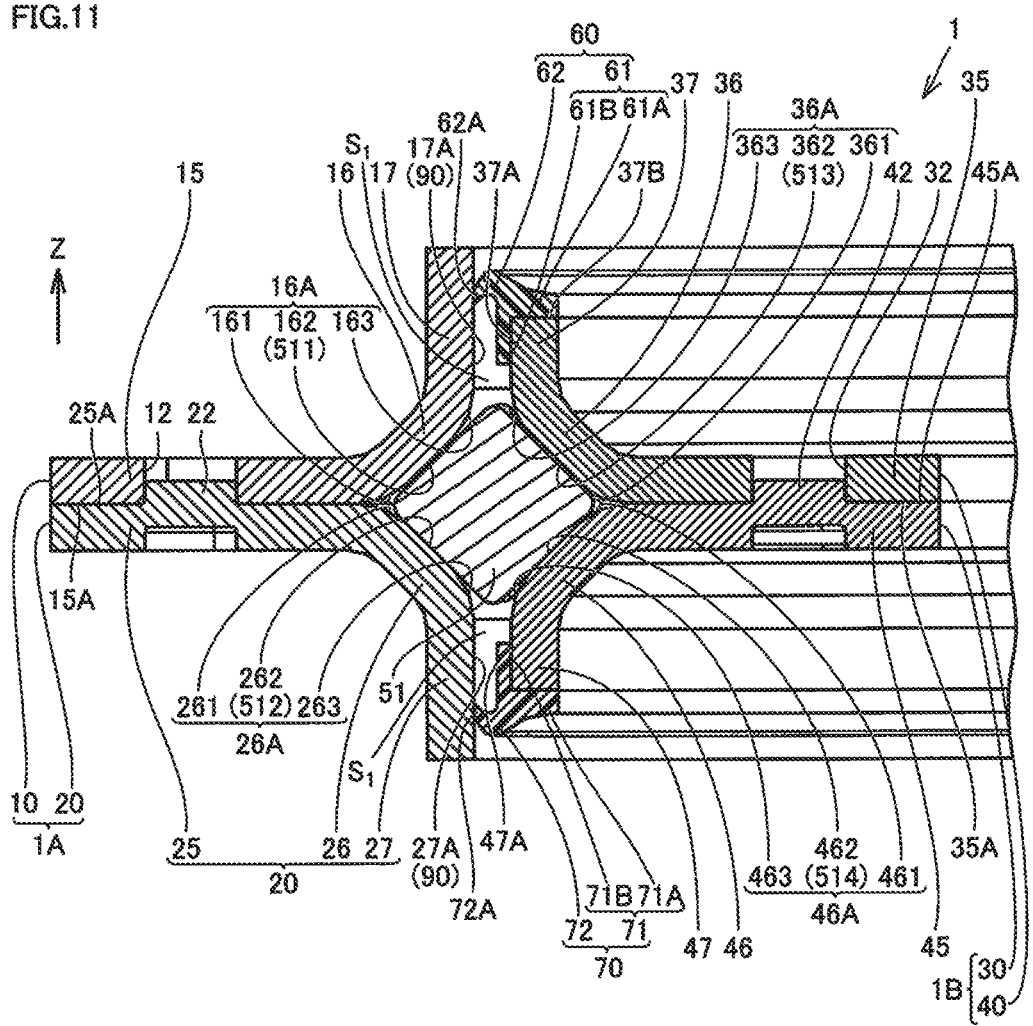
FIG. 11 is a schematic cross-sectional view showing a variation of the rolling bearing in Embodiment 2.

A description will now be made of a variation of the rolling bearing 1 in Embodiment 2. Referring to FIG. 11, the protruding portion 62 protrudes radially outward from the base portion 61. The protruding portion 62 extends so as to be inclined toward the inside of the first space $S_1$ with respect to the inner circumferential surface 17A. The protruding portion 72 protrudes radially outward from the base portion 71. The protruding portion 72 extends so as to be inclined toward the inside of the first space $S_1$ with respect to the inner circumferential surface 27A. With the protruding portions 62, 72 thus extending so as to be inclined toward the inside of the first space $S_1$ with respect to the inner circumferential surfaces 17A, 27A, the leakage of the lubricant from within the first space $S_1$ can further be reduced.

Embodiment 3

A description will now be made of Embodiment 3 of the rolling bearing 1 of the present disclosure. The rolling bearing 1 in Embodiment 3 basically has a similar structure and produces similar effects as the rolling bearing 1 in Embodiment 1. However, Embodiment 3 differs from Embodiment 1 in that the first inner ring 30 and the second inner ring 40 each have a bent portion. The points that are different from the case of Embodiment 1 will mainly be described below.

Figure 12:
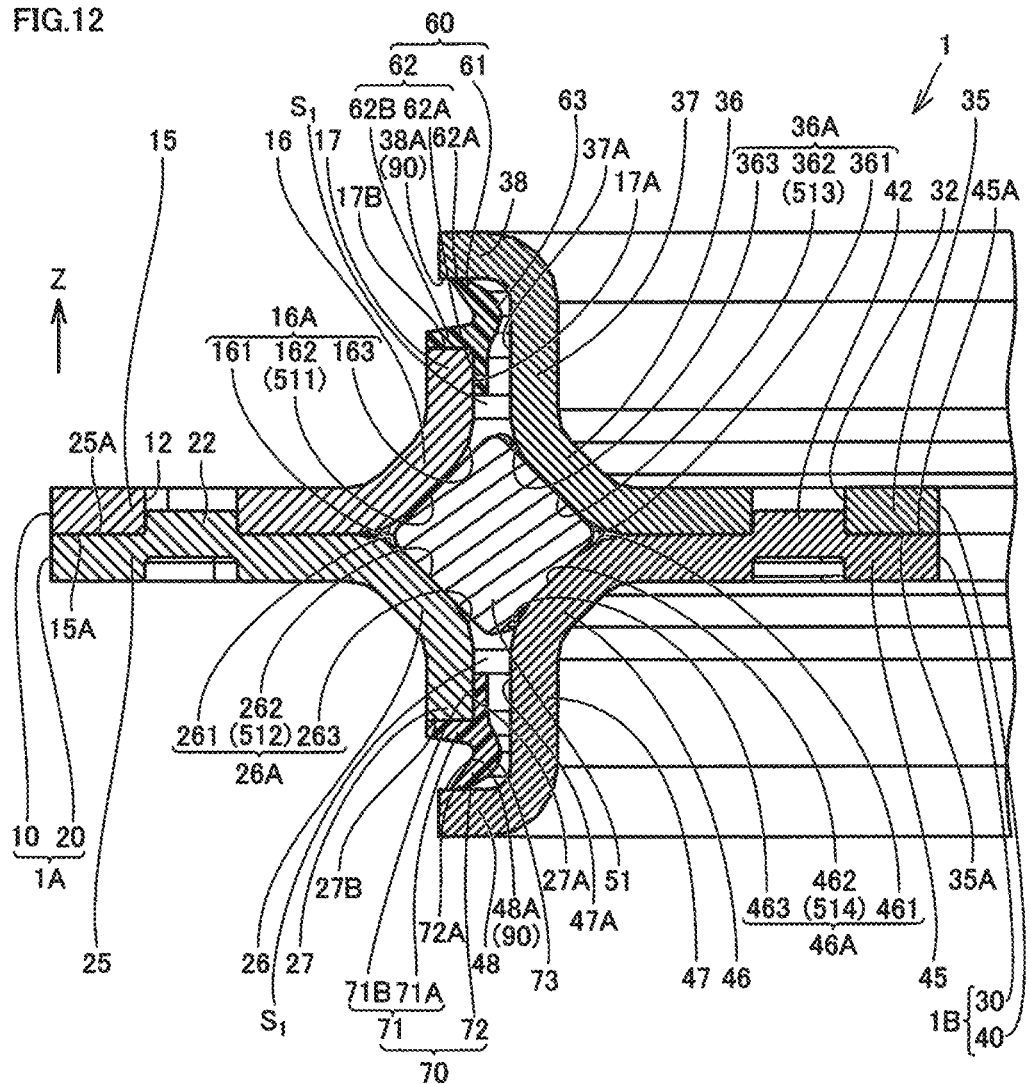
FIG. 12 is a schematic cross-sectional view showing the structure of a rolling bearing in Embodiment 3.

Referring to FIG. 12, the first inner ring 30 includes a first bent portion 38. The first bent portion 38 is arranged to be connected to an end of the ninth portion 37 opposite to the eighth portion 36 in the Z axis direction and to be bent radially outward of the ninth portion 37. The first bent portion 38 is arranged to oppose the third portion 17 in the Z axis direction. The first bent portion 38 has an annular shape. A portion of one end face 38A in the Z axis direction of the first bent portion 38 and a portion of an end face 17B of the third portion 17 opposite to the second portion 16 in the Z axis direction are arranged to oppose each other with a spacing therebetween in the Z axis direction. The above-described partial region of the end face 38A in the first bent portion 38 constitutes the first region 90.

The second inner ring 40 includes a second bent portion 48. The second bent portion 48 is arranged to be connected to an end of the twelfth portion 47 opposite to the eleventh portion 46 in the Z axis direction and to be bent to the opposite side of the tenth portion 45. The second bent portion 48 is arranged to oppose the sixth portion 27 in the Z axis direction. The second bent portion 48 has an annular shape. A portion of one end face 48A of the second bent portion 48 in the Z axis direction and a portion of an end face 27B of the sixth portion 27 opposite to the fifth portion 26 in the Z axis direction are arranged to oppose each other with a spacing therebetween in the Z axis direction. The partial region of the end face 48A in the second bent portion 48 constitutes the first region 90.

The base portion 61 of the first seal member 60 includes an end face contact portion 61A and a side surface contact portion 61B. The end face contact portion 61A is in contact with the end face 17B of the third portion 17 opposite to the second portion 16 in the Z axis direction. The side surface contact portion 61B is in contact with the inner circumferential surface 17A of the third portion 17. The protruding portion 62 extends so as to be inclined toward the outside of the first space $S_1$ with respect to the end face 38A of the first bent portion 38. The protruding portion 62 has a tip end portion 62A that contacts the end face 38A. The protruding portion 62 has a convex portion 63 that protrudes radially inward. A distance in the radial direction between the convex portion 63 and the ninth portion 37 is smaller than a distance in the radial direction between the other portion of the first seal member 60 and the ninth portion 37. A labyrinth portion is thus formed by the convex portion 63 and the ninth portion 37. The base portion 71 of the second seal member 70 includes an end face contact portion 71A and a side surface contact portion 71B. The end face contact portion 71A is in contact with the end face 27B of the sixth portion 27 opposite to the fifth portion 26 in the Z axis direction. The side surface contact portion 71B is in contact with the inner circumferential surface 27A of the sixth portion 27. The protruding portion 72 extends so as to be inclined toward the outside of the first space $S_1$ with respect to the end face 48A of the second bent portion 48. The protruding portion 72 has a tip end portion 72A that contacts the end face 48A. The protruding portion 72 has a convex portion 73 that protrudes radially inward. A distance in the radial direction between the convex portion 73 and the twelfth portion 47 is smaller than a distance in the radial direction between the other portion of the second seal member 70 and the twelfth portion 47. A labyrinth portion is thus formed by the convex portion 73 and the twelfth portion 47. Adopting the above configurations in the first seal member 60 and the second seal member 70 can further reduce the entry of foreign matter into the first space $S_1$.

The rolling bearing 1 of Embodiment 3 above, as with Embodiment 1, can achieve weight reduction as well as downsizing in the axial direction and also reduce the production cost, while reducing both the entry of foreign matter into the first space $S_1$ and the leakage of the lubricant from inside.

Variation

Figure 13:
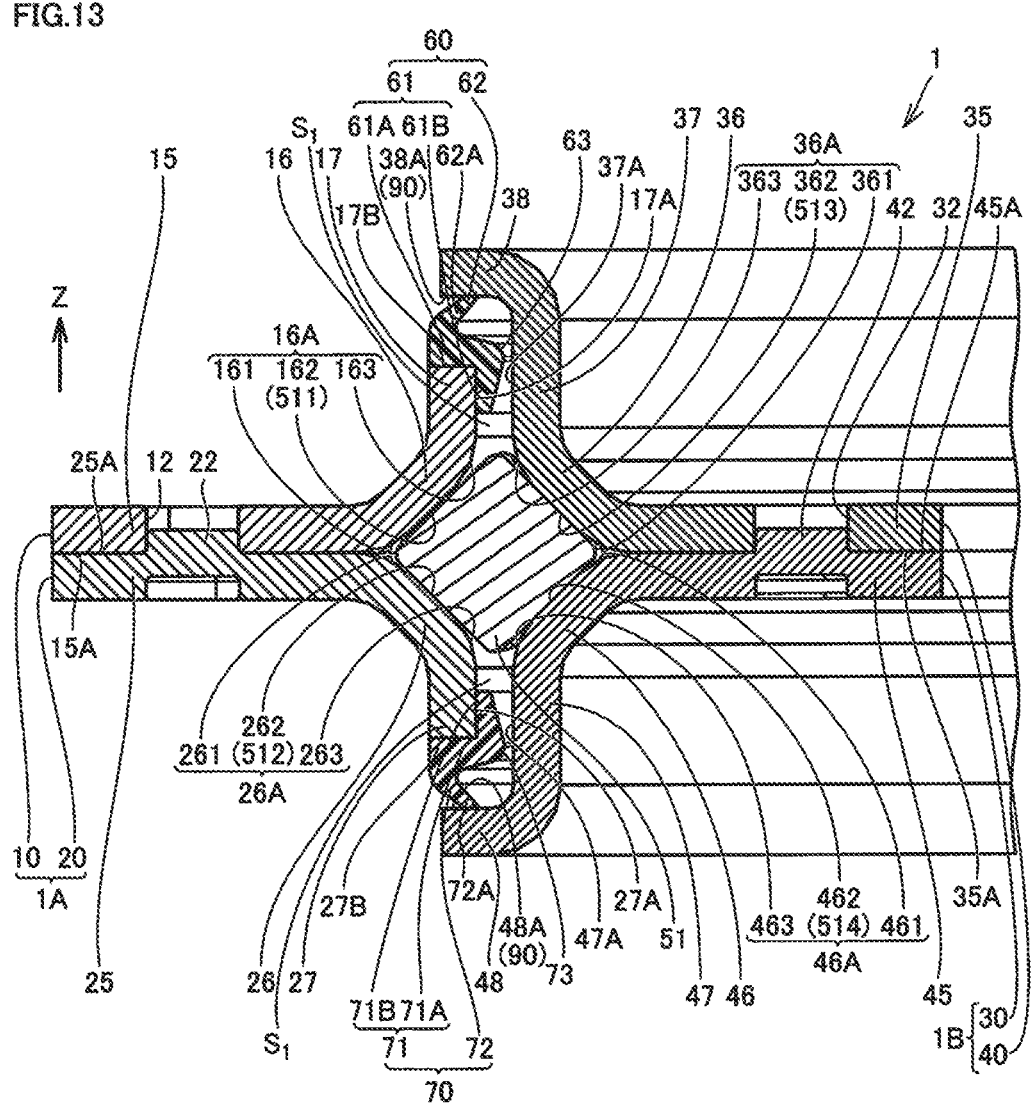
FIG. 13 is a schematic cross-sectional view showing a variation of the rolling bearing in Embodiment 3.

A description will now be made of a variation of the rolling bearing 1 in Embodiment 3. Referring to FIG. 13, the protruding portion 62 extends so as to be inclined toward the inside of the first space $S_1$ with respect to the end face 38A of the first bent portion 38. The base portion 61 has a convex portion 63 that protrudes radially inward. A distance in the radial direction between the convex portion 63 and the ninth portion 37 is smaller than a distance in the radial direction between the other portion of the first seal member 60 and the ninth portion 37. A labyrinth portion is thus formed by the convex portion 63 and the ninth portion 37. The protruding portion 72 extends so as to be bent radially inward. The protruding portion 72 extends so as to be inclined toward the inside of the first space $S_1$ with respect to the end face 48A of the second bent portion 48. The base portion 71 has a convex portion 73 that protrudes radially inward. A distance in the radial direction between the convex portion 73 and the twelfth portion 47 is smaller than a distance in the radial direction between the other portion of the second seal member 70 and the twelfth portion 47. A labyrinth portion is thus formed by the convex portion 73 and the twelfth portion 47.

The protruding portion 62 of the first seal member 60 extends so as to be inclined toward the inside of the first space $S_1$ with respect to the end face 38A of the first bent portion 38. The protruding portion 72 of the second seal member 70 extends so as to be inclined toward the inside of the first space $S_1$ with respect to the end face 48A of the second bent portion 48. Adopting the above configurations in the first seal member 60 and the second seal member 70 can further reduce the leakage of the lubricant from within the first space $S_1$.

Embodiment 4

A description will now be made of Embodiment 4 of the rolling bearing 1 of the present disclosure. The rolling bearing 1 in Embodiment 4 basically has a similar structure and produces similar effects as the rolling bearing 1 in Embodiment 3. However, Embodiment 4 differs from Embodiment 3 in that it has no labyrinth portion. The points that are different from the case of Embodiment 1 will mainly be described below.

Figure 14:
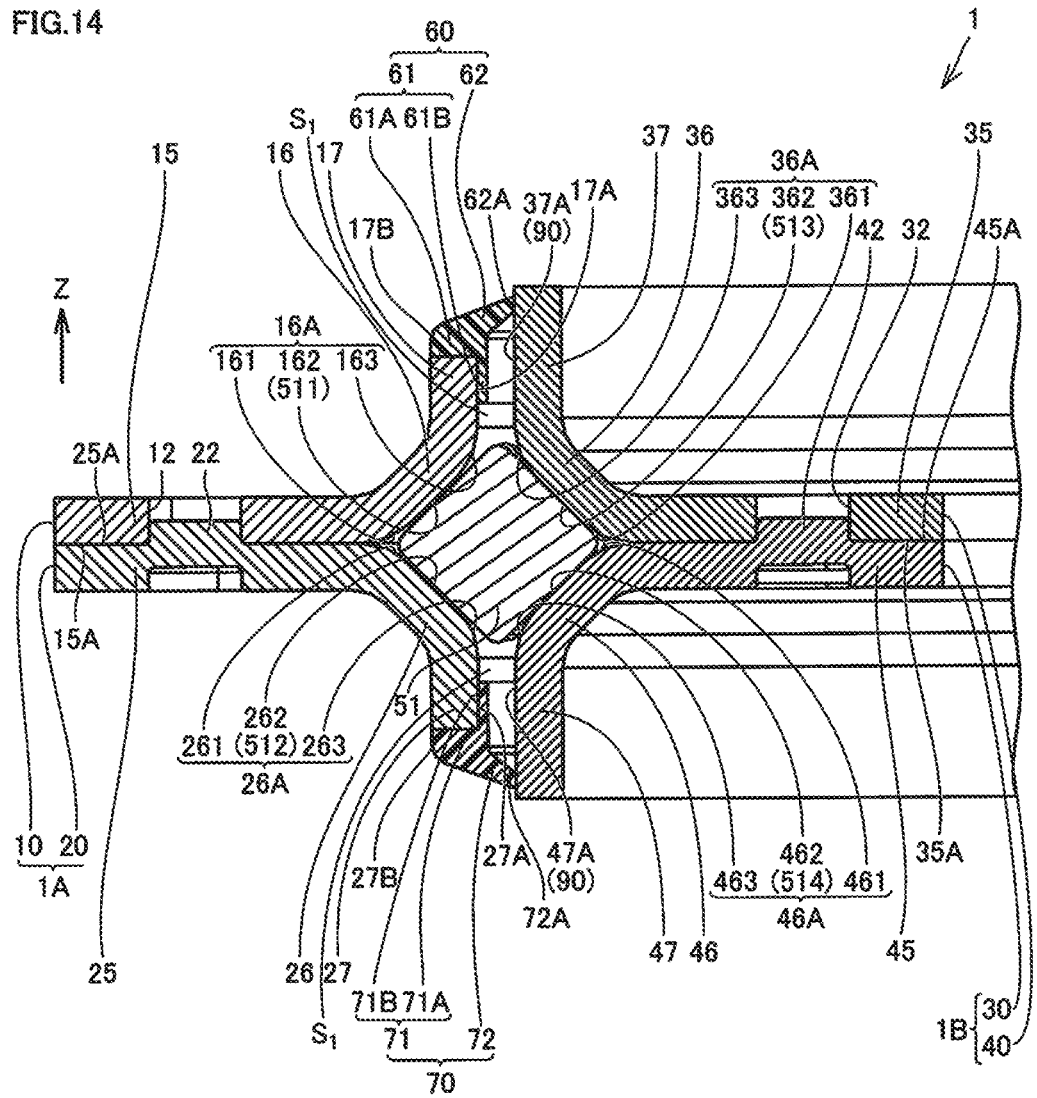
FIG. 14 is a schematic cross-sectional view showing the structure of a rolling bearing in Embodiment 4.

Referring to FIG. 14, the protruding portion 62 of the first seal member 60 protrudes toward the outer circumferential surface 37A of the ninth portion. The protruding portion 62 protrudes radially inward. The protruding portion 62 extends so as to be inclined toward the outside of the first space $S_1$ with respect to the outer circumferential surface 37A. The protruding portion 62 has a tip end portion 62A that contacts the outer circumferential surface 37A. The protruding portion 72 of the second seal member 70 protrudes toward the outer circumferential surface 47A of the twelfth portion 47. The protruding portion 72 protrudes radially inward. The protruding portion 72 extends so as to be inclined toward the outside of the first space $S_1$ with respect to the outer circumferential surface 47A. The protruding portion 72 has a tip end portion 72A that contacts the outer circumferential surface 47A. With the protruding portions 62, 72 extending so that they are inclined toward the outside of the first space $S_1$ with respect to the outer circumferential surfaces 37A, 47A, the entry of foreign matter into the first space $S_1$ can further be reduced.

The rolling bearing 1 of Embodiment 4 above, as with Embodiment 1, can achieve weight reduction as well as downsizing in the axial direction and also reduce the production cost, while reducing both the entry of foreign matter into the first space $S_1$ and the leakage of the lubricant from inside.

Variation

Figure 15:
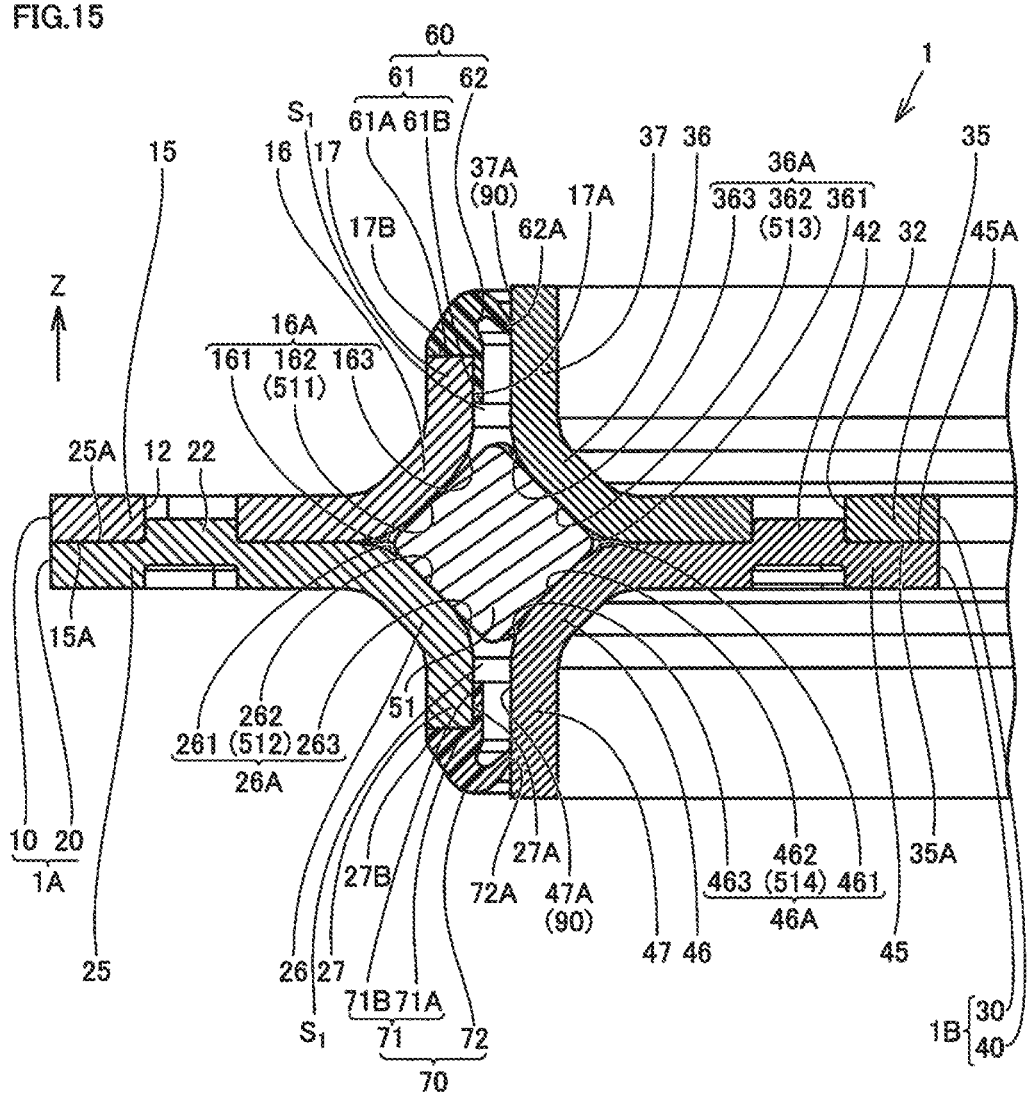
FIG. 15 is a schematic cross-sectional view showing a variation of the rolling bearing in Embodiment 4.

A description will now be made of a variation of the rolling bearing 1 in Embodiment 4. Referring to FIG. 15, the protruding portion 62 extends so as to be inclined toward the inside of the first space $S_1$ with respect to the outer circumferential surface 37A. The protruding portion 72 extends so as to be inclined toward the inside of the first space $S_1$ with respect to the outer circumferential surface 47A. With the protruding portions 62, 72 thus extending so as to be inclined toward the inside of the first space $S_1$ with respect to the inner circumferential surfaces 17A, 27A, the leakage of the lubricant from within the first space $S_1$ can further be reduced.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: rolling hearing; 1A: outer ring; 1B: inner ring; 1C: roller; 1D: seal member; 10: first outer ring; 11, 21, 31, 41: mounting hole; 12, 23, 32, 43: through hole; 13, 22, 33, 42, 62, 72: protruding portion; 15: first portion; 15A, 25A, 35A, 45A: surface; 16: second portion; 16A, 17A, 26A, 27A: inner circumferential surface; 17: third portion; 17B, 18A, 27B, 28A, 37A, 37B, 38A, 47B, 48A, 51B, 51C, 52B, 52C: end face; 18, 38: first bent portion; 20: second outer ring; 25: fourth portion; 26: fifth portion; 27: sixth portion; 28, 48: second bent portion; 30: first inner ring; 35: seventh portion; 36: eighth portion; 36A, 37A, 46A, 47A, 51A, 52A: outer circumferential surface; 37: ninth portion; 40: second inner ring; 45: tenth portion; 46: eleventh portion; 47: twelfth portion; 51: first roller; 52: second roller; 60: first seal member; 61, 71: base portion; 61A, 71A: end face contact portion; 61B, 71B: side surface contact portion; 62A, 72A: tip end portion; 63, 73: convex portion; 70: second seal member; 81: first member; 81A, 82A: screw hole; 82: second member; 83, 84: screw; 90: first region; 111, 211, 311, 411: grain flow; 161: first surface; 162: second surface; 163: third surface; 261: fourth surface; 262: fifth surface; 263: sixth surface; 361: seventh surface; 362: eighth surface; 363: ninth surface; 461: tenth surface; 462: eleventh surface: 463: twelfth surface: 511: first rolling surface: 512: second rolling surface; 513: third rolling surface; and 514: fourth rolling surface.

The invention claimed is:
1. A rolling bearing comprising:
an outer ring;
an inner ring arranged on an inner circumferential side of the outer ring;
a plurality of rolling elements arranged to be capable of rolling on an inner circumferential surface of the outer ring and an outer circumferential surface of the inner ring; and an annular seal member arranged to extend along a boundary of a first space with an outside, the first space being an annular space between the outer ring and the inner ring;
the outer ring including
a first outer ring made of a steel plate and having an annular first rolling surface that constitutes the inner circumferential surface of the outer ring, and
a second outer ring made of a steel plate and having an annular second rolling surface that has a common central axis with the first rolling surface and constitutes the inner circumferential surface of the outer ring, the second outer ring being arranged alongside the first outer ring in a first axis direction in which the central axis of the first rolling surface extends and being fixed to the first outer ring,
the inner ring including
a first inner ring made of a steel plate and having an annular third rolling surface that has a common central axis with the first rolling surface, opposes the second rolling surface, and constitutes the outer circumferential surface of the inner ring, and
a second inner ring made of a steel plate and having an annular fourth rolling surface that has a common central axis with the first rolling surface, opposes the first rolling surface, and constitutes the outer circumferential surface of the inner ring, a line segment connecting the fourth rolling surface and the first rolling surface intersecting a line segment connecting the second rolling surface and the third rolling surface in a cross section including the central axis of the first rolling surface, the second inner ring being arranged alongside the first inner ring in the first axis direction and being fixed to the first inner ring,
the seal member including
an annular base portion fixed to one bearing ring which is one of the outer and inner rings, and
an annular protruding portion protruding from the base portion and extending toward a first region in another bearing ring which is the other of the outer and inner rings, the first region being a region opposing the one bearing ring,
wherein
the first outer ring includes
a first portion having a disk annular shape,
a second portion having a tubular shape and having an annular inner circumferential surface, the second portion extending from an inner edge of the first portion such that an inner diameter of the second portion decreases with increasing distance from the first portion in the first axis direction, and
a third portion having a cylindrical shape, being connected to an end of the second portion opposite to the first portion in the first axis direction, and extending along the first axis direction,
the second outer ring includes
a fourth portion having a disk annular shape and being fixed to the first portion such that main surfaces thereof contact each other,
a fifth portion having a tubular shape and having an annular inner circumferential surface, the fifth portion extending from an inner edge of the fourth portion to a side opposite to the second portion in the first axis direction, the fifth portion having an inner diameter decreasing with increasing distance from the fourth portion, and a sixth portion having a cylindrical shape, being connected to an end of the fifth portion opposite to the fourth portion in the first axis direction, and extending along the first axis direction to a side opposite to the third portion, the first inner ring includes a seventh portion having a disk annular shape, an eighth portion having a tubular shape and having an annular outer circumferential surface, the eighth portion extending from an outer edge of the seventh portion such that an outer diameter of the eighth portion increases with increasing distance from the seventh portion in the first axis direction, and a ninth portion having a cylindrical shape, being connected to an end of the eighth portion opposite to the seventh portion in the first axis direction, and extending along the first axis direction, the second inner ring includes a tenth portion having a disk annular shape and being fixed to the seventh portion such that main surfaces thereof contact each other, an eleventh portion having a tubular shape and having an annular outer circumferential surface, the eleventh portion extending from an outer edge of the tenth portion to a side opposite to the eighth portion in the first axis direction such that an outer diameter of the eleventh portion increases with increasing distance from the tenth portion, and a twelfth portion having a cylindrical shape, being connected to an end of the eleventh portion opposite to the tenth portion in the first axis direction, and extending along the first axis direction to a side opposite to the ninth portion, the inner circumferential surface of the second portion includes the first rolling surface, the inner circumferential surface of the fifth portion includes the second rolling surface, the outer circumferential surface of the eighth portion includes the third rolling surface, and the outer circumferential surface of the eleventh portion includes the fourth rolling surface.

2. The rolling bearing according to claim 1, wherein the seal member is made of an elastic member, and the seal member is formed integrally on the one bearing ring.

3. The rolling bearing according to claim 1, wherein the protruding portion extends so as to be inclined toward an inside of the first space with respect to the first region.

4. The rolling bearing according to claim 1, wherein the protruding portion extends so as to be inclined toward an outside of the first space with respect to the first region.

5. The rolling bearing according to claim 1, wherein the base portion is fixed to one of the third portion and the ninth portion, and the protruding portion protrudes toward the first region in the other of the third portion and the ninth portion.

6. The rolling bearing according to claim 5, wherein the protruding portion is arranged in the first space.

7. The rolling bearing according to claim 1, wherein the first outer ring further includes an annular bent portion arranged at an end of the third portion opposite to the second portion in the first axis direction and bent radially inward of the third portion to oppose the ninth portion, the base portion is fixed to the ninth portion, and the protruding portion protrudes toward the first region in the bent portion.

8. The rolling bearing according to claim 1, wherein the first inner ring further includes an annular bent portion arranged at an end of the ninth portion opposite to the eighth portion in the first axis direction and bent radially outward of the ninth portion to oppose the third portion, the base portion is fixed to the third portion, and the protruding portion protrudes toward the first region in the bent portion.

\* \* \* \* \*